US010533837B2

(12) United States Patent
Frisken

(10) Patent No.: US 10,533,837 B2
(45) Date of Patent: Jan. 14, 2020

(54) MULTICHANNEL OPTICAL RECEIVERS

(71) Applicant: CYLITE PTY LTD, Clayton (AU)

(72) Inventor: Steven James Frisken, Vaucluse (AU)

( * ) Notice: Subject to any disclaimer, the term of this patent is extended or adjusted under 35 U.S.C. 154(b) by 53 days.

(21) Appl. No.: 15/535,712

(22) PCT Filed: Dec. 14, 2015

(86) PCT No.: PCT/AU2015/050788
§ 371 (c)(1),
(2) Date: Jun. 14, 2017

(87) PCT Pub. No.: WO2016/094940
PCT Pub. Date: Jun. 23, 2016

(65) Prior Publication Data
US 2017/0363415 A1    Dec. 21, 2017

(30) Foreign Application Priority Data

Dec. 14, 2014 (AU) .................................. 2014905056
May 28, 2015 (AU) .................................. 2015901970

(51) Int. Cl.
*G01B 9/02* (2006.01)
(52) U.S. Cl.
CPC ..... *G01B 9/02091* (2013.01); *G01B 9/02004* (2013.01); *G01B 9/02027* (2013.01); *G01B 9/02028* (2013.01); *G01B 9/02032* (2013.01)
(58) Field of Classification Search
CPC ............ G01B 9/02091; G01B 9/02032; G01B 9/02004; G01B 9/02028; G01B 9/02027
See application file for complete search history.

(56) References Cited

U.S. PATENT DOCUMENTS 3,914,018 A    10/1975   DeShazer
4,492,436 A     1/1985   Bergmann
(Continued)

FOREIGN PATENT DOCUMENTS

EP    1253398 A1   10/2002
EP    2279691 A1    2/2011

OTHER PUBLICATIONS

Bonin et al 'In vivo Fourier-domain full-field OCT of the human retina with 1.5 million A-lines/s' Optics Letters 35 (2010) 3432-3434.
(Continued)

*Primary Examiner* — Hwa Andrew Lee
(74) *Attorney, Agent, or Firm* — Darren Gardner

(57) ABSTRACT

Methods and apparatus are presented for multichannel optical coherence tomography. Light from a wavelength tuneable or steppable optical source is separated into one or more sample beams and one or more reference beams, and the one or more sample beams directed onto a sample to form one or more interaction regions. A plurality of returning probe beams are collected and mixed with the one or more reference beams to form an interference pattern comprising a plurality of interferograms having at least two distinct carrier frequencies. The multichannel optical apparatus can be provided with polarisation discrimination by mixing the returning probe beams with two orthogonally polarised reference beams to form one or more interference patterns each comprising a plurality of interferograms having at least two distinct carrier frequencies. In preferred embodiments each interferogram has a distinct carrier frequency, which may be provided by ensuring that each returning probe beam has a distinct propagation angle with respect to a reference beam. Also presented is a means of generating a plurality of beamlets from a sample beam using a nonreciprocal optical splitter configured to split a beam propagating in a forwards
(Continued)

direction into a plurality of beamlets, and to transmit without splitting a beam propagating in the reverse direction.

27 Claims, 9 Drawing Sheets

(56) References Cited

U.S. PATENT DOCUMENTS

| | | | |
|---|---|---|---|
| 4,548,478 A | 10/1985 | Shirasaki | |
| 5,321,501 A | 6/1994 | Swanson | |
| 5,459,570 A | 10/1995 | Swanson | |
| 5,465,147 A | 11/1995 | Swanson | |
| 5,823,942 A * | 10/1998 | Toida | A61B 5/0084 600/160 |
| 5,956,355 A | 9/1999 | Swanson | |
| 6,111,645 A | 8/2000 | Tearney et al. | |
| 6,501,551 B1 | 12/2002 | Tearney et al. | |
| 7,859,682 B2 | 12/2010 | Smith et al. | |
| 7,884,945 B2 | 2/2011 | Srinivasan et al. | |
| 8,027,042 B2 | 9/2011 | Holmes et al. | |
| 8,446,593 B1 | 5/2013 | Ellerbee | |
| 8,559,012 B2 | 10/2013 | Tearney et al. | |
| 2002/0071624 A1 | 6/2002 | Frisken et al. | |
| 2003/0025913 A1* | 2/2003 | Izatt | A61B 5/0066 356/479 |
| 2004/0246490 A1* | 12/2004 | Wang | A61B 5/0059 356/479 |
| 2007/0002327 A1 | 1/2007 | Zhou et al. | |
| 2010/0182609 A1 | 7/2010 | Wang et al. | |
| 2012/0120407 A1 | 5/2012 | Frisken | |
| 2012/0327423 A1 | 12/2012 | Hanebuchi | |
| 2014/0028974 A1 | 1/2014 | Tumlinson | |
| 2014/0071456 A1* | 3/2014 | Podoleanu | G01B 9/0209 356/497 |
| 2014/0313477 A1 | 10/2014 | Raymond | |
| 2014/0320816 A1 | 10/2014 | Abramoff et al. | |

OTHER PUBLICATIONS

Nakamura et al 'High-speed three-dimensional human retinal imaging by line-field spectral domain optical coherence tomography' Optics Express 15 (2007) 7103-7116.

Belmonte et al 'Capacity of coherent free-space optical links using diversity-combining techniques' Optics Express 17 (2009) 12601-12611.

Watanabe et al 'Development of fiber bundle type fan-out for 19-core multicore fiber' OECC/ACOFT 2014 (Jul. 6-10, 2014), Melbourne, Australia, pp. 44-46.

Davis 'Interferometric synthetic aperture microscopy: Physics-based image reconstruction from optical coherence tomography data' 14th Int Conf Image Proc, San Antonio TX 2007.

Schmitt 'Array detection for speckle reduction in optical coherence microscopy' Physics in Medicine and Biology 42 (1997) 1427-1439.

Tur et al 'Polarization-induced fading in fiber-optic sensor arrays' Journal of Lightwave Technology 13 (1995) 1269-1276.

Kocaoglu et al 'Adaptive optics optical coherence tomography at 1 MHz' Biomedical Optics Express 5 (2014) 4186-4200.

Liu et al 'Computed optical interferometric tomography for high-speed volumetric cellular imaging' Biomedical Optics Express 5 (2014) 2988-3000.

Bu et al 'One-shot parallel complex Fourier-domain optical coherence tomography using a spatial carrier frequency' Optical Engineering 47 (2008) 050502.

Wang et al 'Megahertz streak-mode Fourier domain optical coherence tomography' Journal of Biomedical Optics 16 (2011) 066016.

South et al 'Differentiation of ex vivo human breast tissue using polarization-sensitive optical coherence tomography' Biomedical Optics Express 5 (2014) 3417-3426.

Huang et al 'Full-range parallel Fourier-domain optical coherence tomography using a spatial carrier frequency' Applied Optics 52 (2013) 958-965.

* cited by examiner

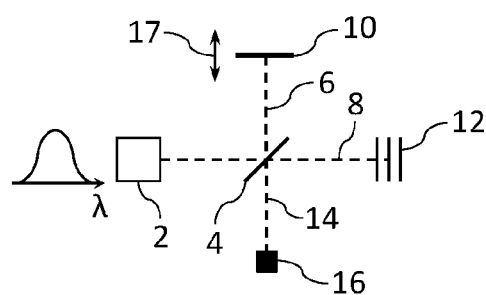
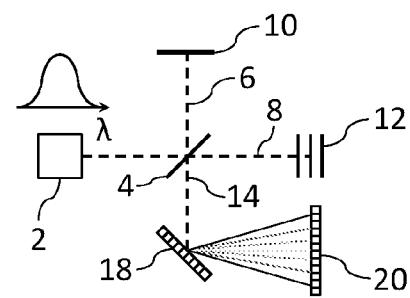
Fig. 1
Fig. 2
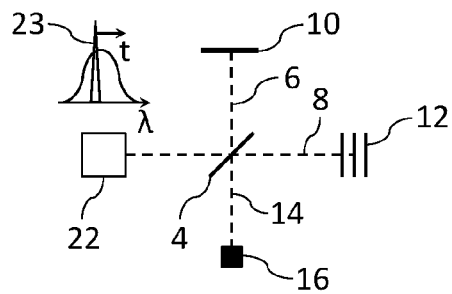
Fig. 3
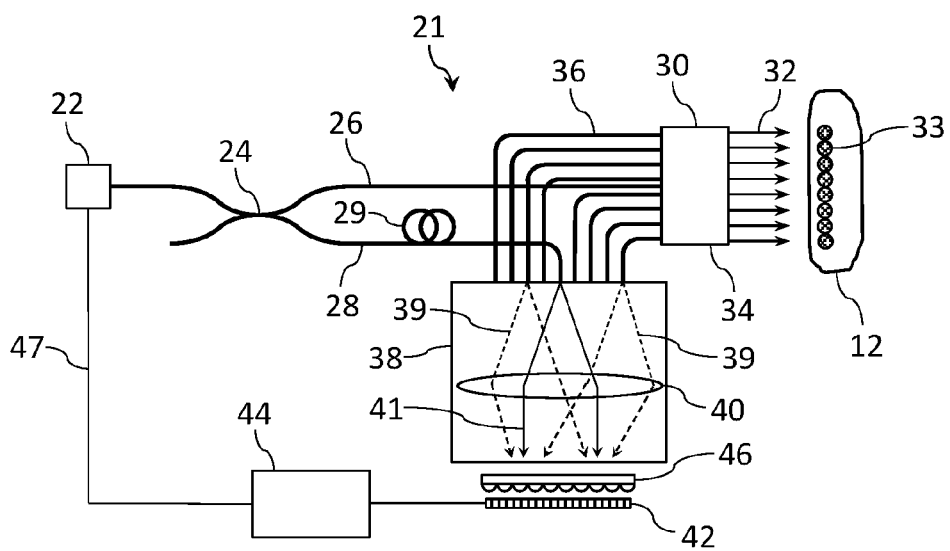
Fig. 4

MULTICHANNEL OPTICAL RECEIVERS

FIELD OF THE INVENTION

The invention relates to multichannel optical receivers, in particular for swept-source optical coherence tomography (OCT) systems. However it will be appreciated that the invention is not limited to this particular field of use.

RELATED APPLICATIONS

The present application claims priority from Australian Provisional Patent Application Nos 2014905056 entitled 'Multichannel optical receivers' filed on 14 Dec. 2014, and 2015901970 entitled 'High resolution 3-D spectral domain optical imaging apparatus and method' filed on 28 May 2015, the contents of which are incorporated herein by reference.

BACKGROUND OF THE INVENTION

Any discussion of the prior art throughout the specification should in no way be considered as an admission that such prior art is widely known or forms part of the common general knowledge in the field.

Optical coherence tomography (OCT) is a widely used interferometric technique for studying biological samples including in vivo tissue, with lateral and depth resolution, using information contained within the amplitude and phase of reflected light. OCT systems generally utilise a Michelson interferometer configuration, with two main approaches being employed: time domain OCT and spectral domain OCT. As shown in FIG. 1, in a typical time domain OCT system light from a broadband optical source 2 such as a superluminescent light emitting diode (SLED) is split with a beamsplitter 4 into a reference beam 6 and a sample beam 8. Back-reflected light from a reference mirror 10 and one or more layers within a sample 12 are recombined by the beamsplitter 4, and the interference signal 14 captured with a photodetector 16. An interference signal 14 is only obtained when the round trip optical path lengths of the sample and reference arms are matched to within the coherence length of the broadband source 2, which should be small (e.g. of order a few microns) to provide good depth resolution. The optical path length difference between the sample and reference arms is scanned by axial movement 17 of the reference mirror 10, and the recorded interference signal demodulated to provide a depth-resolved profile of reflectivity within the sample 12, commonly known as an 'A scan'.

Spectral domain OCT systems are classified as either spectrometer based or swept source based. FIG. 2 shows a typical spectrometer based system, which differs from the time domain OCT system of FIG. 1 in that instead of scanning the reference mirror 10, the interference signal 14 is dispersed with a diffraction grating 18 or other spectral demultiplexer and the various wavelengths detected simultaneously along a linear photodetector array 20. As shown in FIG. 3, swept source (SS) systems have a wavelength tuneable or steppable light source 22, such as an external cavity frequency tuned semiconductor laser, with a narrow instantaneous spectral line width 23 that is scanned in time either continuously or in discrete steps. In this case the spectrum of the interference signal 14 is recorded by a photodetector 16 as the wavelength of the light source is scanned. Basic principles of SS OCT systems are described in U.S. Pat. No. 5,956,355 entitled 'Method and apparatus for performing optical measurements using a rapidly frequency-tuned laser'. In both types of spectral domain OCT system phase information from various reflective layers in the sample 12 is encoded in the interference spectrum, so that a depth-resolved reflectivity profile (i.e. an A scan) of the sample is extracted with a Fourier transform. Generally speaking, both types of spectral domain OCT systems have a ~20 to 30 dB sensitivity advantage over time domain OCT systems.

OCT systems can be made polarisation sensitive by the use of a polarising beam splitter in place of the conventional power beam splitter 4, and the addition of various polarising optical elements. A key feature of polarisation sensitive OCT is that in addition to being able to discriminate between different tissue types based on the reflected light, the birefringence properties of the sample in transmission to and from the reflection points can be analysed and used as a contrast-enhancing feature. In many biological systems for example, muscle tissue and fibrous tissues often have different polarisation features compared to fatty and malignant tissues.

OCT techniques can be adapted to provide a laterally resolved 'B scan' by scanning the sample beam 8 relative to the sample 12 in one or two axes. Faster A scan and B scan acquisition is generally desirable and has been greatly improved over the previous 20 to 25 years by advances in several fields including faster swept source scanning rates and photodetector array readout speeds. However a fundamental limitation with scanning spot schemes, especially for in vivo applications, is presented by laser safety regulations: reducing dwell time to increase scanning speed without being able to increase the applied power will inevitably degrade the signal to noise ratio. Additionally, high speed swept wavelength laser systems are expensive and can be very difficult to use effectively. For example high speed Fourier Domain Mode Locked (FDML) lasers, which have been used in many high speed OCT demonstrations to date, require extremely precise synchronisation of filters and control of the dispersion properties and polarisation state of a fibre ring laser. There is a need therefore to enhance acquisition times to reduce motion artefacts in samples without increasing significantly the complexity of the lasers and electronics.

Consequently there has also been research into 'parallelised' OCT systems in which an extended sample area is probed with lateral resolution, or an array of sample spots probed simultaneously. It is relatively straightforward to parallelise time domain OCT, e.g. by utilising a CCD camera and imaging optics as described in U.S. Pat. No. 5,465,147 entitled 'Method and apparatus for acquiring images using a CCD detector array and no transverse scanner'. This provides a 2D en face image, with depth resolution provided by scanning the reference mirror as usual in time domain OCT. Swept source spectral domain OCT can be parallelised in similar fashion, as described on Bonin et al 'In vivo Fourier-domain full-field OCT of the human retina with 1.5 million A-lines/s', Optics Letters 35(20), 3432-3434 (2010). Parallelisation of spectrometer-based spectral domain OCT is somewhat more complicated, because one axis of a 2D photodetector array is occupied by the wavelength dispersion. In a configuration described in Nakamura et al 'High-speed three-dimensional human retinal imaging by line-field spectral domain optical coherence tomography', Optics Express 15(12), 7103-7116 (2007), cylindrical lenses are used to produce a line illumination on a sample retina and a reference mirror, and the combined return sample and reference beams dispersed with a grating and detected with a 2D CMOS camera. A Fourier transform along the spectral axis provides an A scan for each position along the illuminated line. For full 3D imaging the illuminated line is mechanically scanned in the orthogonal direction and the CMOS camera read out repeatedly.

Given the relative simplicity of its basic setup and its significant sensitivity advantage over time domain OCT, parallelised swept source OCT is extremely promising for high speed 3D imaging, which is of particular interest for in vivo imaging where motion artefacts are of concern. However camera-based swept source systems, as described in the above-mentioned Bonin et al paper for example, are in fact unsuitable for in vivo applications. Because each frame corresponds to a single wavelength, the acquisition time for each A scan is equal to the frame period times the number of k-points (wavelength samples) acquired. Even for very high speed cameras with frame rates of 100 s of kHz, this can lead to A scan acquisition times of many ms which can lead to motion artefacts especially with in vivo samples. Relative movement of the sample during the A scan acquisition time will be equivalent to an error in wavelength and will degrade the image. For example in 10 ms a shift of only 0.2 μm in sample position will create a π phase error in reading between the extremes of wavelength.

OCT image acquisition speed can be improved by parallelising the detection channels as disclosed in O. P. Kocaoglu et al 'Adaptive optics optical coherence tomography at 1 MHz', *Biomedical Optics Express* 5(12), 4186-4200 (2014), but this is a complicated scheme involving multiple spectrometers accessed sequentially via an optical switch assembly.

There is a need therefore for a parallelised or multichannel optical receiver that improves the image acquisition speed of OCT, in particular swept source OCT, with less complexity than in the prior art.

OBJECT OF THE INVENTION

It is an object of the present invention to overcome at least one of the limitations of the prior art. It is an object of the present invention in its preferred form to provide a swept source OCT system with a multichannel optical receiver that enables faster A scan acquisition compared to conventional camera-based systems.

Definitions

The apparatus and methods of the present invention involve the detection and analysis of interferograms formed by mixing one or more probe beams with a reference beam. The spatial fringes in each interferogram have a frequency component which is a function of the wavelength $\lambda$ of the light in the beams and of the relative angle $\theta$ between the reference beam and the respective probe beam. This frequency component F is given by the reciprocal of the fringe period $\Omega$ according to $F=1/\Omega=\tan(\theta)/\lambda$. In the present specification we refer to this frequency component as the 'carrier frequency' of the interferogram, as it carries the encoded information of the probe beam, i.e. phase and intensity at each wavelength. This should not be confused with the use of the term 'carrier frequency' in telecommunications where it refers to the frequency of the signal, which may for example be from a laser or a microwave or RF source, prior to modulation of an information stream.

SUMMARY OF THE INVENTION

According to a first aspect of the present invention there is provided a multichannel optical coherence tomography apparatus comprising a wavelength tuneable or steppable optical source and an interferometer, said interferometer being configured to:
- separate light from said optical source into one or more sample beams and one or more reference beams;
- direct said one or more sample beams onto a sample to form one or more interaction regions within which said light interacts with said sample;
- collect a plurality of returning probe beams emanating from said one or more interaction regions;
- mix said plurality of returning probe beams with said one or more reference beams to form an interference pattern comprising a plurality of interferograms having a set of carrier frequencies, wherein said set of carrier frequencies comprises at least two distinct carrier frequencies; and
- detect said interference pattern with a photodetector array, such that a temporal sequence of interference patterns can be detected with said photodetector array as said optical source is stepped or tuned in wavelength.

In certain embodiments the interferometer is configured to collect a plurality of returning probe beams emanating at different angles from an interaction region, while in other embodiments the interferometer is configured to collect a plurality of returning probe beams emanating from a plurality of positions within an interaction region.

In yet other embodiments the interferometer is configured to split a sample beam into a plurality of beamlets that interact with the sample in a plurality of interaction regions, and the interferometer is preferably configured to collect light emanating from each of the plurality of interaction regions to form a like plurality of returning probe beams. The interferometer preferably comprises a module configured to split the sample beam into the plurality of beamlets, and to collect the plurality of returning probe beams.

In preferred embodiments the module comprises a nonreciprocal optical splitter configured to split the sample beam such that the plurality of beamlets propagate in different directions, and to transmit the plurality of returning probe beams without splitting. The nonreciprocal optical splitter preferably comprises a series of two or more polarisation splitting elements and one or more nonreciprocal polarisation rotation elements. In preferred embodiments the nonreciprocal polarisation rotation elements comprise Faraday rotation elements, and the polarisation splitting elements comprise birefringent wedges. The nonreciprocal optical splitter preferably comprises n Faraday rotation elements separated by birefringent wedges, and with a birefringent wedge at each end. The interferometer is preferably configured to provide the sample beam with a linear polarisation parallel or perpendicular to the optic axis of the birefringent wedge at the end of the nonreciprocal optical splitter proximate to the optical source, such that the nonreciprocal optical splitter splits the sample beam into $2^n$ beamlets. Preferably the wedge angles of the birefringent wedges sum to zero such that the returning probe beams emerge from the nonreciprocal optical splitter with unchanged propagation directions.

In certain embodiments the interferometer comprises a nonreciprocal angle unit positioned between the optical source and the nonreciprocal optical splitter, for altering the propagation direction of either the sample beam or the returning probe beams, but not both. The nonreciprocal angle unit is preferably configured to alter the propagation direction of the sample beam. Preferably, the nonreciprocal angle unit comprises two birefringent wedges separated by a Faraday rotation element.

In certain embodiments the interferometer comprises an optical system for separating the light from the optical source into a plurality of sample beams and one or more reference beams, directing the sample beams onto the sample, and collecting the plurality of returning probe beams. The optical system preferably comprises an optical waveguide array. Preferably, the optical waveguide array comprises an optical fibre ribbon. The optical waveguide array preferably comprises a waveguide for propagating a reference beam. Preferably, the apparatus further comprises a Faraday rotator mirror for back-reflecting the reference beam.

In preferred embodiments the apparatus further comprises a nonreciprocal polarisation splitter for changing the propagation angle of the returning probe beams relative to the light from the optical source. The nonreciprocal polarisation splitter is preferably configured to pass the light from the optical source without deflection, and to deflect the returning probe beams. In preferred embodiments the apparatus further comprises an apertured reflector for reflecting either the returning probe beams or the light from the optical source. Preferably, the apertured reflector comprises two prisms with polished optical surfaces for total internal reflection, fixedly attached and spaced apart from each other with one or more localised regions of an index matched adhesive.

In certain embodiments the set of carrier frequencies comprises at least four distinct carrier frequencies. In other embodiments the set of carrier frequencies comprises between two and forty distinct carrier frequencies. In preferred embodiments the set of carrier frequencies comprises a distinct carrier frequency for each of the plurality of interferograms.

In certain embodiments the interferometer is configured to provide each of the returning probe beams with a distinct propagation angle with respect to a reference beam, thereby providing the distinct carrier frequency for each of the plurality of interferograms. The interferometer preferably comprises an optical waveguide array comprising a reference beam waveguide and a plurality of probe beam waveguides arranged such that there is a distinct separation between the reference waveguide and each of the probe beam waveguides, thereby providing the distinct propagation angles.

In alternative embodiments the interferometer is configured to provide each of the returning probe beams with two or more distinct propagation angles with respect to a reference beam. Preferably, the interferometer is configured to provide each of the returning probe beams with distinct propagation angles with respect to two reference beams having different polarisation states. In certain embodiments the interferometer comprises a polarisation splitting element for forming two reference beams having different polarisation states. Preferably, the interferometer comprises an optical waveguide array comprising a waveguide for each of the two reference beams and a plurality of probe beam waveguides, arranged such that there is a distinct separation between each of the reference waveguides and each of the probe beam waveguides, thereby providing the distinct propagation angles with respect to two reference beams. In alternative embodiments the interferometer comprises a polarisation-dependent angular deflection element configured to split the reference beam equally, and to split the returning probe beams according to their polarisation state. The polarisation-dependent angular deflection element preferably comprises a birefringent wedge pair.

In preferred embodiments the photodetector array is configured to be read out in parallel. Preferably, the photodetector array is a linear photodetector array.

According to a second aspect of the present invention there is provided an apparatus comprising a nonreciprocal optical splitter configured to split a light beam propagating in a forwards direction into two or more beamlets for interaction with a sample, and to transmit without splitting returning probe beams propagating in a reverse direction for subsequent analysis.

In certain embodiments the apparatus further comprises optics for directing the returning probe beams from the nonreciprocal optical splitter to an optical system configured to analyse the returning probe beams.

The nonreciprocal optical splitter preferably comprises a series of two or more polarisation splitting elements and one or more nonreciprocal polarisation rotation elements. More preferably, the nonreciprocal polarisation rotation elements comprise Faraday rotation elements, and the polarisation splitting elements comprise birefringent wedges. In preferred embodiments the nonreciprocal optical splitter comprises n Faraday rotation elements separated by birefringent wedges, and with a birefringent wedge at each end. The nonreciprocal optical splitter is preferably configured to split a linearly polarised forwards propagating light beam into $2^n$ beamlets. Preferably, the wedge angles of the birefringent wedges sum to zero such that the returning probe beams emerge from the nonreciprocal optical splitter with unchanged propagation directions. In certain embodiments the apparatus further comprises optics for directing the two or more beamlets onto a sample, and for collecting the returning probe beams.

According to a third aspect of the present invention there is provided a nonreciprocal optical splitter configured to split a linearly polarised forwards propagating light beam into $2^n$ beams, and to transmit arbitrarily polarised backwards propagating light beams without splitting, said nonreciprocal optical splitter comprising (n+1) birefringent wedges each having a wedge angle and an optic axis, separated by n Faraday rotation elements each selected to provide a nonreciprocal rotation of $-\alpha$ at a central design wavelength to the polarisation state of a light beam propagating therethrough, wherein the optic axis of the $k^{th}$ birefringent wedge in the forwards direction is oriented at an angle $\phi=(k-1)*\alpha$ with respect to a reference direction, wherein $n\geq 1$ and k is an integer from 1 to (n+1).

In preferred embodiments n is at least 2. The wedge angles of the birefringent wedges preferably sum to zero such that the backwards propagating light beams emerge from the nonreciprocal optical splitter with unchanged propagation directions. Preferably, $\alpha$ is in the range of 20 to 25 degrees, more preferably in the range of 22 to 23 degrees, and most preferably 22.5 degrees.

According to a fourth aspect of the present invention there is provided a multichannel optical receiver for analysing two or more signals, said multichannel optical receiver comprising an interferometer and a photodetector array, said interferometer being configured to:

receive said two or more signals;

mix said two or more signals with a common local oscillator comprising a laser beam to form an interference pattern comprising two or more interferograms, wherein each interferogram has a distinct carrier frequency; and detect said interference pattern with said photodetector array.

In certain embodiments the two or more signals have the same polarisation state.

Preferably, the multichannel optical receiver further comprises a processor for analysing the phase and amplitude of the two or more signals.

In certain embodiments the two or more signals are derived from the same source as the common local oscillator. In other embodiments the wavelength of the common local oscillator differs from the wavelength of each of the two or more signals by 0.1% or less.

In certain embodiments the interferometer is configured to provide each of the two or more signals with a distinct propagation angle with respect to the common local oscillator, thereby providing the distinct carrier frequency for each interferogram. Preferably, the interferometer comprises an optical waveguide array comprising a waveguide for the common local oscillator and a waveguide for each received signal, wherein the waveguides are arranged such that there is a distinct separation between the common local oscillator waveguide and each of the received signal waveguides, thereby providing the distinct propagation angles.

In other embodiments the interferometer is configured to provide each of the two or more signals with two or more distinct propagation angles with respect to the common local oscillator, wherein the two or more distinct propagation angles differ according to the polarisation state of the common local oscillator or the polarisation states of the signals.

According to a fifth aspect of the present invention there is provided a method for analysing a sample, said method comprising the steps of:

separating light from a wavelength tuneable or steppable optical source into one or more sample beams and one or more reference beams;

directing said one or more sample beams onto said sample to form one or more interaction regions within which said light interacts with said sample;

collecting a plurality of returning probe beams emanating from said one or more interaction regions;

mixing said plurality of returning probe beams with said one or more reference beams to form an interference pattern comprising a plurality of interferograms having a set of carrier frequencies, wherein said set of carrier frequencies comprises at least two distinct carrier frequencies; and detecting said interference pattern with a photodetector array, such that a temporal sequence of interference patterns can be detected with said photodetector array as said optical source is stepped or tuned in wavelength.

According to a sixth aspect of the present invention there is provided a method for splitting a linearly polarised forwards propagating light beam into $2^n$ beams, said method comprising passing said linearly polarised forwards propagating light beam through a nonreciprocal optical splitter comprising (n+1) birefringent wedges each having a wedge angle and an optic axis, separated by n Faraday rotation elements each selected to provide a nonreciprocal rotation of $-\alpha$ at a central design wavelength to the polarisation state of a light beam propagating therethrough, wherein the optic axis of the $k^{th}$ birefringent wedge in the forwards direction is oriented at an angle $\phi=(k-1)*\alpha$ with respect to a reference direction, wherein $n \geq 1$ and k is an integer from 1 to (n+1).

According to a seventh aspect of the present invention there is provided a method for analysing two or more signals, said method comprising the steps of:

receiving said two or more signals;

mixing said two or more signals with a common local oscillator comprising a laser beam to form an interference pattern comprising two or more interferograms, wherein each interferogram has a distinct carrier frequency;

detecting said interference pattern with a photodetector array; and processing said interference pattern to analyse the phase and amplitude of said two or more signals.

According to an eighth aspect of the present invention there is provided an article of manufacture comprising a non-transitory computer usable medium having a computer readable program code configured to operate the apparatus according to the first aspect, or to operate the multichannel optical receiver according to the fourth aspect, or to implement the method according to any one of the fifth, sixth or seventh aspects.

BRIEF DESCRIPTION OF THE DRAWINGS

Preferred embodiments of the invention will now be described, by way of example only, with reference to the accompanying drawings in which:

FIG. 1 shows schematically a time domain OCT system;

FIG. 2 shows schematically a spectrometer-based spectral domain OCT system;

FIG. 3 shows schematically a swept source-based spectral domain OCT system;

FIG. 4 shows in schematic form a multichannel OCT apparatus according to an embodiment of the present invention;

DETAILED DESCRIPTION OF THE INVENTION

Figure 5:
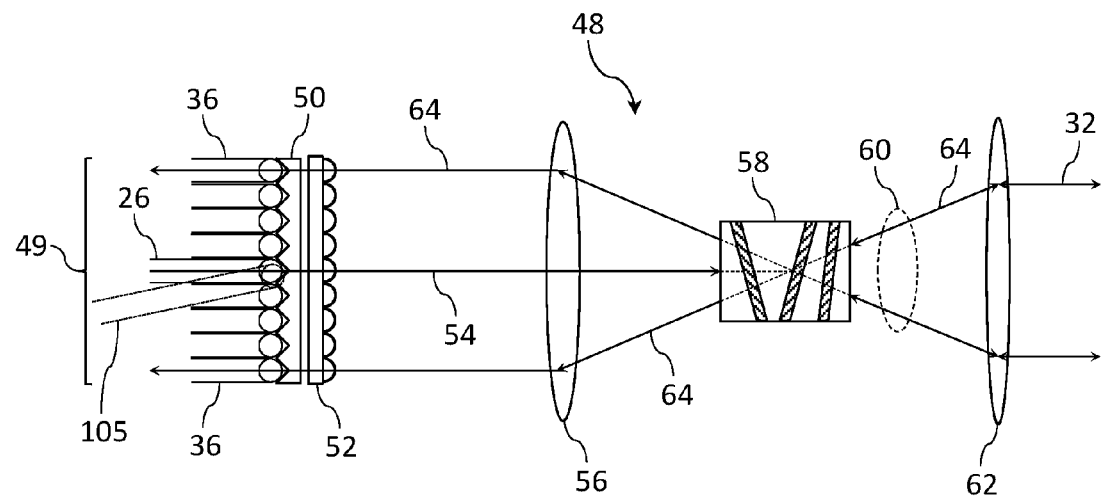
FIG. 5 shows in schematic form the operation of a nonreciprocal module designed to split an input beam into multiple probe beams and collect the back reflected probe beams with minimal intrinsic wastage of reflected power.

FIG. 4 shows in schematic form a multichannel optical coherence tomography (OCT) apparatus 21 according to a first embodiment of the present invention. Light from a wavelength tuneable or steppable optical source, in the form of a swept source 22 with a tuning range of (1300±20) nm, is separated by a first splitter in the form of a 2×2 fibre optic coupler 24 into a sample path optical fibre 26 and a reference path optical fibre 28. In one particular embodiment the splitting ratio of the coupler 24 is 90/10 sample/reference and the reference path optical fibre 28 has a length 29 chosen for close matching of the sample and reference arm optical path lengths. The sample path optical fibre 26 is directed to a second splitter 30 for splitting the sample beam into a plurality of probe beams or beamlets 32 which are directed onto a sample 12 such as a tissue sample to form a plurality of interaction regions 33 within which the beamlets interact with the sample. At least some of the light reflected back or otherwise emanating from each interaction region is gathered by collection optics 34 and directed into separate optical fibres 36. These optical fibres are directed to an optical system 38 where the returning probe beams 39 are mixed with a reference beam 41 from the reference path fibre 28 to form an interference pattern comprising a plurality of interferograms with a set of carrier frequencies comprising at least two distinct carrier frequencies, detected with a fast photodetector array 42 such as a fast linear photodiode array or 2D matrix. A temporal sequence of interference patterns will be detected with the photodetector array as the swept source 22 is tuned or stepped in wavelength. In preferred embodiments the optical system 38 includes at least one lens 40 as shown, with the carrier frequencies determined by the respective angles between the reference beam 41 and each of the returning probe beams 39 as they impinge on the photodetector array 42.

To simplify analysis of the plurality of inteferograms in each interference pattern, the reference path fibre 28 and the optical fibres 36 carrying the returning probe beams 39 are preferably configured with respect to the optical system 38 such that the set of carrier frequencies comprises a distinct carrier frequency for each interferogram. In some applications it may be advantageous or necessary to have returning probe beams forming equal and opposite angles with the reference beam. However in this case the associated interferograms will have the same carrier frequency, which precludes the determination of an unambiguous phase for each wavelength that would be needed to remove conjugate images and allow unambiguous imaging either side of the zero delay line for an extended depth image.

For optical sources in the 1300 nm region the fast photodetector array 42 may for example be a Hamamatsu G8909-01 40 channel InGaAs PIN photodiode array with parallel readout and a bandwidth in excess of 1 GHz. For sources in the visible region a comparable silicon-based array would be appropriate. Generally, the apparatus described in the present specification can be adapted for use with light in the visible and near infrared regions of the electromagnetic spectrum.

Data from the photodiode array 42 is read out by a computer 44, preferably in parallel for higher speed acquisition of multiple beams, and processed using suitable non-transitory machine readable program code, e.g. using Fourier Transform techniques, to determine the amplitude and phase of each back reflected signal corresponding to the different returning probe beams 39. As the swept source 22 is scanned the computer 44 processes the interference patterns for each of the different wavelengths to recover information about the reflectivity of the sample 12 at different depths to construct multiple simultaneously acquired A-scans. In preferred embodiments a micro lens array 46 is provided in front of the linear photodiode array 42 to capture the interference patterns with a high fill factor. Communication between the computer 44 and the swept source 22, which may be via wired or wireless means, is represented by the line 47.

OCT systems, including those illustrated in FIGS. 1 to 4, invariably operate in a reflective geometry where probe light is back reflected from one or more interaction regions on or within a sample, although the present invention is not so limited. That is to say, the optical systems of the present invention could be configured to operate in a transmissive geometry where one or more probe beams are collected after passing through and interacting with one or more regions on or within a sample, then mixed with a reference beam to form an interference pattern. It should be understood that the term 'returning probe beams' refers to light that has interacted with a sample, irrespective of whether the OCT system geometry is reflective or transmissive.

In the usual reflective geometry as shown in FIG. 4, the second splitter 30 for dividing the optical power into multiple probe beams or beamlets 32 and the collection optics 34 for collecting the back-reflected beamlets are preferably formed as a single module. Preferably this module is designed to be nonreciprocal such that no reflected power is intrinsically wasted by splitting of the back-reflected beamlets. FIG. 5 shows one particular embodiment of a nonreciprocal module 48 comprising an optical fibre array 49, a nonreciprocal optical splitter 58 and collimating lenses 56 and 62. The optical fibre array 49 comprises the sample path optical fibre 26 and eight return fibres 36 positioned in a V-groove array 50 providing a close spacing, e.g. a centre-to-centre spacing of 127 µm for 125 µm diameter fibres. Optionally, a micro lens array 52 is positioned proximate to the optical fibre array 49 to tailor the Rayleigh range of the beams, i.e. provide a decreased numerical aperture of the light beam 54 emitted from the sample path fibre 26 and a reduced numerical aperture capture for returning probe beams 64 incident on the return fibres 36. The numerical aperture provided by the micro lens array 52 may for example be approximately 0.03 radians. Light 54 from the sample path fibre 26 is collimated by a lens 56 then enters a nonreciprocal optical splitter 58 that splits it into an array 60 of beams of approximately uniform power that propagate at different angles, with the splitter designed such that these angles are suitable for launching returning probe beams 64 through the lens 56 and into the return fibres 36. In this particular embodiment the nonreciprocal optical splitter 58 is designed to split the outgoing sample beam 54 into an array 60 of eight beams, corresponding to the number of return fibres 36 in the optical fibre array 49. The uniformly split beams are collimated by a second lens 62 to create an array of probe beams or beamlets 32 that can be directed onto a sample. In contrast, the return light paths 64, i.e. the returning probe beams, propagate through the nonreciprocal optical splitter 58 and emerge with propagation directions suitable for launch into corresponding return fibres 36. That is, the nonreciprocal optical splitter 58 splits forwards propagating beams into multiple beams with different propagation angles or directions, but does not do so with backwards propagating beams. In preferred embodiments the propagation angles or directions of the returning probe beams 64 are unchanged by the nonreciprocal optical splitter. It will be appreciated that significant intrinsic loss would occur on the return path if passive splitting means such as a series of 2×2 fibre couplers were used instead of the nonreciprocal optical splitter 58 to split the sample beam 54 and collect the returning probe beams 64. Although the specific embodiment shown in FIG. 5 is designed to create and collect eight discrete beams for probing one or more samples, or one or more regions of a sample, it will be appreciated that different numbers of beams could be created depending on the specific design of the nonreciprocal optical splitter 58. As will be seen from the following discussion of exemplary nonreciprocal splitting elements, any power of two splitting (e.g. 2, 4, 8 or 16 beams) can be conveniently achieved.

Figures 6A, 6B:
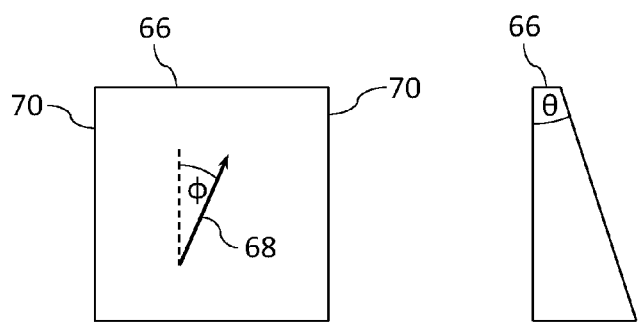
FIGS. 6(a) and 6(b) illustrate in plan and side views a birefringent wedge.

In preferred embodiments the nonreciprocal optical splitter 58 is constructed from a series of polarisation splitting elements, such as birefringent wedges or walk-off plates, and nonreciprocal polarisation rotation elements. In particularly preferred embodiments the nonreciprocal optical splitter 58 is constructed from a series of birefringent wedges and Faraday rotation elements. A typical birefringent wedge 66, composed of $YVO_4$ for example, is shown in plan view and side view in FIGS. 6(a) and 6(b). We define θ to be the physical wedge angle and φ to be the orientation of the optic axis 68 of the wedge with respect to the vertical direction, which for convenience is shown as parallel to the sides 70 of the wedge.

Figure 7:
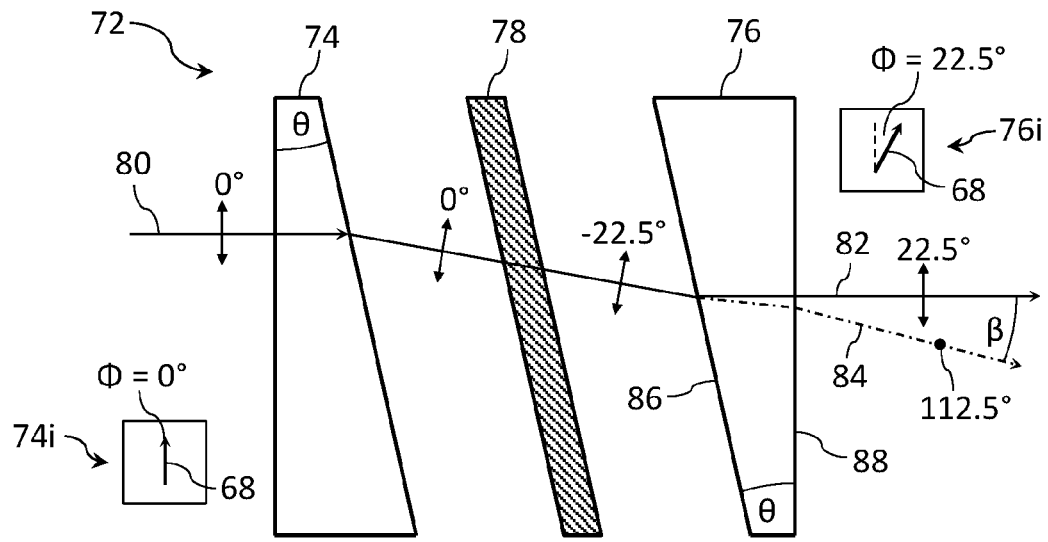
FIGS. 7 and 8 illustrate in schematic side view the operation of a 1:2 nonreciprocal optical splitter in the forwards and reverse directions respectively.

For the purposes of explaining the nonreciprocal splitting principle, FIG. 7 shows in schematic side view a 1:2 nonreciprocal optical splitter 72 comprising first and second $YVO_4$ birefringent wedges 74 and 76 with wedge angles θ=+0.0625 radians and −0.0625 radians respectively, separated by a Faraday rotation element 78 selected to provide a path-independent polarisation state rotation of −22.5 degrees at the central design wavelength. The Faraday rotation element may for example be an MGL Garnet thick film from Integrated Photonics, Inc that provides latching operation, i.e. does not require a bias magnet. As shown in the respective insets 74i and 76i, the first and second birefringent wedges 74 and 76 are cut with φ=0 degrees and +22.5 degrees respectively. A vertically polarised beam 80, provided for example by a polarisation preserving sample path fibre and propagating from left to right in the horizontal plane, encounters the first birefringent wedge 74 at normal incidence and propagates into it without deflection as an extraordinary ray (e-ray) because its polarisation state is parallel to the optic axis 68. The beam is refracted as it exits the wedge 74 but remains vertically polarised, then has its polarisation rotated by −22.5 degrees as it traverses the Faraday rotation element 78. Upon entering the second birefringent wedge 76 the beam is split 50/50 into an e-ray 82 polarised at +22.5 degrees, i.e. parallel to the optic axis 68 of the second wedge 76, and an ordinary ray (o-ray) 84 polarised at +112.5 degrees, i.e. normal to the optic axis 68. Note that the splitting ratio is 50/50, i.e. the e-ray 82 and the o-ray 84 have equal intensities, because after traversing the Faraday rotation element 78 the beam is polarised at 45 degrees relative to the optic axis 68 of the second wedge 76. Note also that the e-ray 82 is refracted more strongly than the o-ray 84 at the interface 86 because $YVO_4$ is a positive uniaxial material, with the divergence angle determined by the relative magnitudes of the extraordinary refractive index $n_e$ and the ordinary refractive index $n_o$. After refraction at the interface 86 the e-ray 82 propagates in the horizontal direction, i.e. parallel to the input beam 80, because the wedge angles θ of the first and second birefringent wedges are equal and opposite in sign. It then encounters the exit interface 88 at normal incidence and emerges from the second wedge 76 without deflection. The o-ray 84 on the other hand is refracted again at the interface 88 to emerge at an angle β to the e-ray 82.

If the incoming beam 80 were polarised horizontally instead of vertically, i.e. an o-ray with respect to the first birefringent wedge 74, the result would still be a 1:2 splitting with a 50/50 intensity ratio. However in this case the horizontally propagating output beam 82 would be polarised at +112.5 degrees while the deflected output beam 84 would be polarised at +22.5 degrees and propagating at some angle above beam 82. It will be appreciated that an incoming beam 80 with any other polarisation state will be split into three output beams on the basis of its vertical and horizontal polarisation components, or four output beams if the wedge angles θ of the first and second birefringent wedges 74 and 76 are not equal and opposite.

Figure 8:
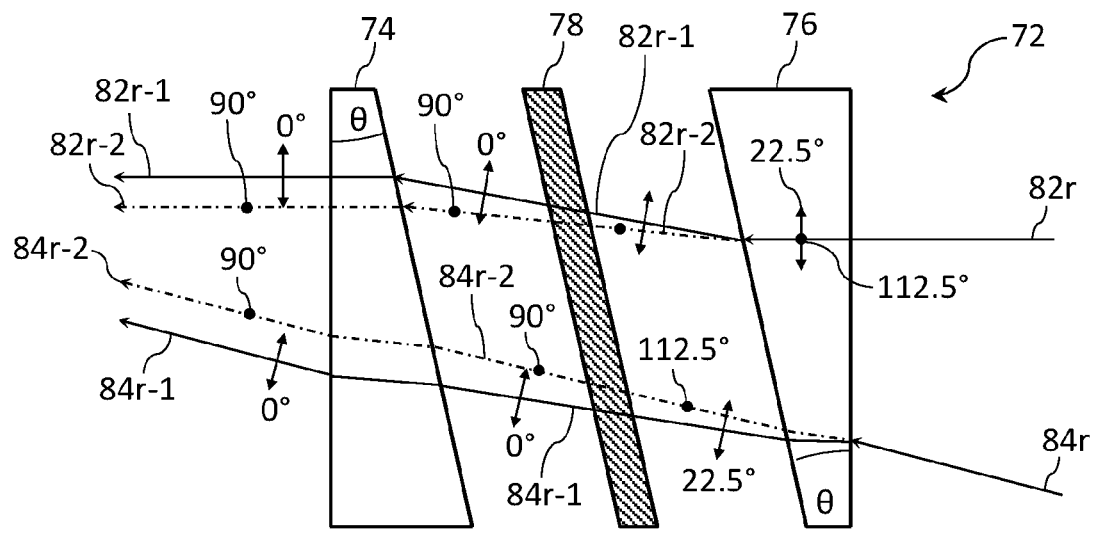

In FIG. 8 we reverse the output beam paths 82 and 84 of FIG. 7 to demonstrate the nonreciprocal nature of the optical splitter 72. We firstly consider a beam 82r of arbitrary polarisation propagating from right to left in the reverse direction to the output beam 82 of FIG. 7. This beam 82r is separated by the second birefringent wedge 76 into two components 82r-1 and 82r-2 with orthogonal linear polarisation states, which propagate co-linearly before diverging as they exit the wedge. Component 82r-1, an e-ray, is polarised at 22.5 degrees while component 82r-2, an o-ray, is polarised at 112.5 degrees, i.e. parallel and normal to the optic axis 68 of the wedge 76 respectively. After traversing the Faraday rotation element 78 component 82r-1 is polarised at 0 degrees and is therefore an e-ray with respect to the first birefringent wedge 74, whereas component 82r-2 is polarised at 90 degrees and is therefore an o-ray. Consequently the first birefringent wedge refracts these components by different amounts such that they both emerge propagating in the same direction, separated only by a walk off that in practice is insignificant such that they effectively form a single output beam. That is, there is effectively no splitting of the backwards-propagating beam 82r. Furthermore because the two wedge angles θ are equal and opposite the components 82r-1 and 82r-2 emerge propagating in the same direction as the backwards-propagating beam 82r.

Secondly, we consider a beam 84r of arbitrary polarisation propagating from right to left in the reverse direction to the output beam 84 of FIG. 7. The second birefringent wedge 76 separates this beam 84r into two divergent components 84r-1 and 84r-2 with orthogonal linear polarisation states. Component 84r-1, an e-ray, is polarised at 22.5 degrees while component beam 84r-2, an o-ray, is polarised at 112.5 degrees, i.e. parallel and normal to the optic axis 68 of the wedge 76 respectively. After traversing the Faraday rotation element 78 component 84r-1 is polarised at 0 degrees and is therefore an e-ray with respect to the first birefringent wedge 74, whereas component 84r-2 is polarised at 90 degrees and is therefore an o-ray. Consequently the first birefringent wedge refracts these components by different amounts such that they both emerge propagating in the same direction, separated only by a walk off that in practice is insignificant such that they effectively form a single output beam. That is, there is effectively no splitting of the backwards-propagating beam 84r. Furthermore because the two wedge angles θ are equal and opposite the components 84r-1 and 84r-2 emerge propagating in the same direction as the backwards-propagating beam 84r.

In summary it can be seen that in the forwards direction, i.e. left to right as shown in FIG. 7, the 1:2 nonreciprocal optical splitter 72 splits a vertically or horizontally polarised input beam 80 into two linearly polarised beams of equal intensities and propagating in different directions: a first beam 82 propagating in the same direction as the input beam; and a second beam 84 propagating at an angle β to the input beam direction. On the other hand in the backwards direction, i.e. right to left as shown in FIG. 8, the propagation direction of an arbitrarily polarised beam is unchanged.

The 1:2 nonreciprocal optical splitter 72 resembles the polarisation independent optical isolator shown in FIGS. 4A and 4B of U.S. Pat. No. 4,548,478 entitled 'Optical device', in that both devices comprise a Faraday rotation element between two birefringent wedges. The isolator device could provide a nonreciprocal splitting functionality if an input beam were incident at the port generally considered to be the output port, and with a specific polarisation state that allows 1:2 splitting. The 'reject' beam paths of the isolator would then be used for the probe beams. There are however significant differences between the two devices. Firstly, because the nonreciprocal splitter requires a path-independent rotation of only 22.5 degrees instead of 45 degrees its Faraday rotation element need be only half as long, which effectively halves the wavelength and temperature dependences of the splitting ratio. Secondly, the nonreciprocal splitter 72 is not polarisation independent in the forwards direction because the splitting depends on the polarisation state of the input beam 80.

It should be noted that FIGS. 7 and 8 are 'exploded' views, i.e. showing the three elements of the 1:2 nonreciprocal optical splitter 72 spaced apart. This is for ease of explanation of the operation of the nonreciprocal splitter, and in practice the elements will be closely spaced and optionally bonded with a suitable adhesive. It will be appreciated that the walk offs between the paired return path components 82r-1 and 82r-2, and 84r-1 and 84r-2 in FIG. 8 have been exaggerated by the exploded view.

Figure 9:
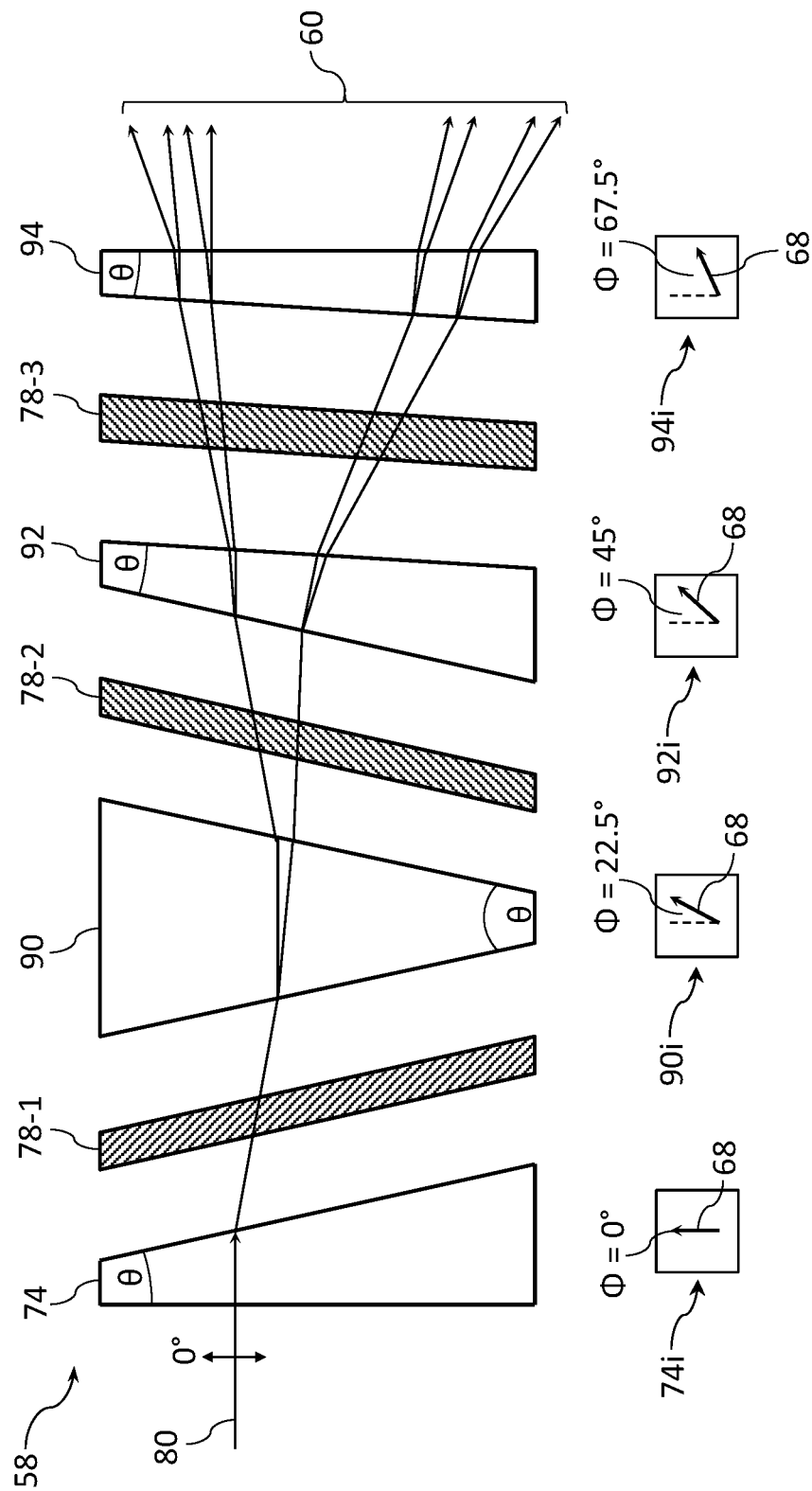
FIG. 9 illustrates in schematic side view the operation of a 1:8 nonreciprocal optical splitter in the forwards direction.

The nonreciprocal splitting principle can be extended with further sequences of birefringent wedges and Faraday rotation elements. FIG. 9 shows in schematic exploded side view a 1:8 nonreciprocal optical splitter 58 suitable for use in the nonreciprocal module 48 of FIG. 5, comprising four YVO$_4$ birefringent wedges 74, 90, 92 and 94 separated by Faraday rotation elements 78-1, 78-2 and 78-3. The birefringent wedges 74, 90, 92 and 94 have wedge angles $\theta$=+0.0625, −0.15625, +0.0625 and +0.03125 radians respectively and, as shown in the insets 74$i$, 90$i$, 92$i$ and 94$i$, are cut with $\phi$=0, 22.5, 45 and 67.5 degrees respectively. It will be noted that the wedge angles $\theta$ of the four birefringent wedges sum to zero, which is a preferred but non-essential feature. The three Faraday rotation elements 78-1, 78-2 and 78-3 are each selected to provide a path-independent polarisation state rotation of −22.5 degrees at the central design wavelength. A vertically polarised beam 80 propagating from left to right will be split by this 1:8 nonreciprocal optical splitter 58 into an array 60 of eight beams with different deflection angles, one of which will be zero. That is, one of the eight exit beams will propagate in the same direction as the input beam 80, which is a consequence of the wedge angles summing to zero. Importantly, the 1:8 splitting will be uniform in intensity because after traversing each Faraday rotation element the respective beams will each be polarised at 45 degrees relative to the optic axis 68 of the subsequent birefringent wedge. In the reverse direction, i.e. right to left in FIG. 9, the eight beams will be passed with unchanged propagation angles or directions, again because the wedge angles sum to zero. If the wedge angles did not sum to zero then the backwards-propagating beams would emerge with different propagation angles or directions, but importantly they still would remain as single beams. In practice the seven elements of the 1:8 nonreciprocal optical splitter 58 will be closely spaced and optionally bonded with a suitable adhesive.

It will be appreciated that a nonreciprocal optical splitter comprising n Faraday rotation elements separated by birefringent wedges, and with a birefringent wedge at each end, will split a linearly polarised forwards propagating beam into $2^n$ beams provided the input beam polarisation is parallel or perpendicular to the optic axis of the first birefringent wedge. In preferred embodiments n is at least 2, yielding a 1:4 or higher splitting ratio. In general, the nonreciprocal optical splitter described above with reference to FIGS. 7 to 9 comprises (n+1) birefringent wedges, each having a wedge angle and an optic axis, separated by n Faraday rotation elements each selected to provide a nonreciprocal rotation of $\alpha$ at the central design wavelength to the polarisation state of a light beam propagating therethrough, where n≥1. For k=1 to (n+1) in the forwards direction, i.e. the splitting direction, the optic axis of the $k^{th}$ birefringent wedge is oriented at an angle $\phi$=(k−1)*$\alpha$ with respect to a reference direction. In the particular embodiments illustrated in FIGS. 7 to 9 the reference direction is vertical. A nonreciprocal optical splitter of this design will split a linearly polarised forwards-propagating light beam into $2^n$ beams provided the incoming light beam is polarised parallel or perpendicular to the reference direction, whereas arbitrarily polarised backwards-propagating light beams will remain as single beams. In preferred embodiments the wedge angles of the (n+1) birefringent wedges sum to zero such that the backwards-propagating light beams emerge with unchanged propagation angles or directions. To ensure that the splitting of a forwards-propagating beam is approximately equal in intensity, $\alpha$ is preferably in the range of 20 to 25 degrees, more preferably in the range of 22 to 23 degrees, and most preferably 22.5 degrees at the central design wavelength. In practice the rotation imparted by a given Faraday rotation element varies with both wavelength and temperature, and over typical operating conditions with a tuneable source the actual rotation imparted by a Faraday rotation element with a nominal rotation of −22.5 degrees will generally be in the range of −20 to −25 degrees.

Figure 10:
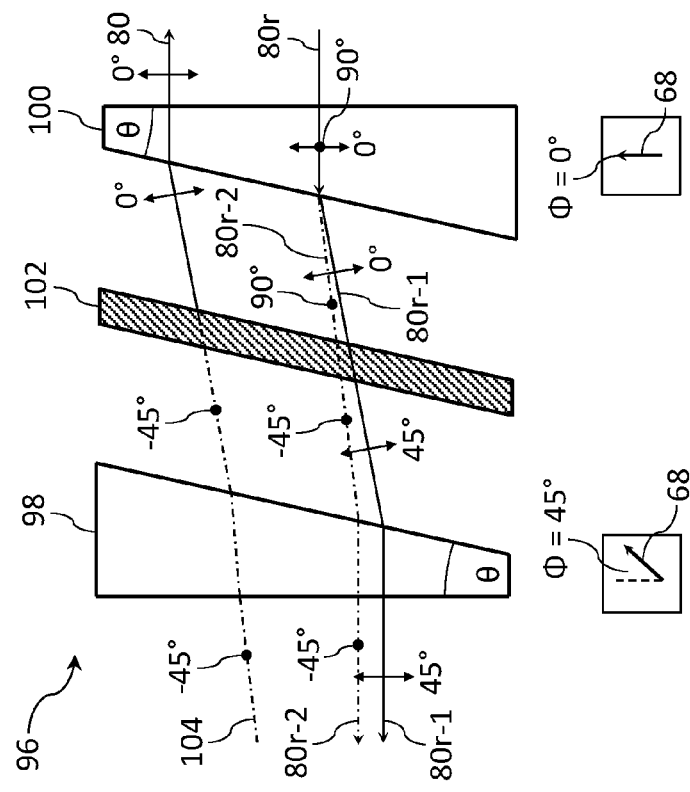
FIG. 10 shows in schematic side view the operation of a nonreciprocal angle unit in the forwards and reverse directions.

Referring to FIG. 5, it will be recalled that the lens 56 collimates the returning probe beams 64 for launch into the array of return optical fibres 36. Since one of the eight beams is not deflected in either direction through the three stage nonreciprocal optical splitter 58, it will be launched back into the sample path fibre 26. To utilise this light, one could for example include a 2:2 fibre coupler or a circulator in the sample fibre path. In alternative embodiments a nonreciprocal angle unit is inserted between the lens 56 and the 1:8 nonreciprocal optical splitter 58, to alter the propagation direction of the light 54 from the sample path optical fibre 26. FIG. 10 shows in schematic exploded side view a nonreciprocal angle unit 96 comprising two birefringent wedges 98 and 100 composed of YVO$_4$ for example, separated by a Faraday rotation element 102. Other forms of polarisation splitting elements such as birefringent walk-off plates could be used in place of the birefringent wedges. The nonreciprocal angle unit 96 superficially resembles the 1:2 nonreciprocal optical splitter 72 shown in FIG. 7, but in this case the optic axes of the first and second birefringent wedges 98 and 100 differ in orientation by 45 degrees rather than 22.5 degrees, and the Faraday rotation element 102 is selected to provide a path-independent polarisation state rotation of 45 degrees at the central design wavelength.

A beam 104 polarised linearly at −45 degrees, provided for example by a polarisation preserving input fibre and propagating from left to right at an angle slightly below the horizontal, is an ordinary ray (o-ray) with respect to the first birefringent wedge 98 because its polarisation state is normal to the optic axis 68. This beam is refracted as it enters and exits the wedge 98 but remains polarised at −45 degrees, then has its polarisation rotated by 45 degrees as it traverses the Faraday rotation element 102. The now vertically polarised beam enters the second birefringent wedge 100 as an e-ray and emerges as a vertically polarised beam 80 propagating in the horizontal direction, suitable for launch into the 1:8 nonreciprocal splitter 58 of FIG. 9 or the 1:2 nonreciprocal splitter 72 of FIG. 7.

We now reverse this beam path to demonstrate the nonreciprocal nature of the angle unit 96. A beam 80*r* of arbitrary polarisation propagating from right to left in the reverse direction to the beam 80 is separated by the second birefringent wedge 100 into two components 80*r*-1 and 80*r*-2 with orthogonal linear polarisation states, which propagate co-linearly before diverging as they exit the wedge. Component 80*r*-1, an e-ray, is polarised at 0 degrees while component 80*r*-2, an o-ray, is polarised at 90 degrees, i.e. parallel and normal to the optic axis 68 of the wedge 100 respectively. After traversing the Faraday rotation element 102 the component 80*r*-1 is polarised at 45 degrees and is therefore an e-ray with respect to the first birefringent wedge 98, whereas component 80*r*-2 is polarised at 135 degrees (or −45 degrees) and is therefore an o-ray. Consequently the first birefringent wedge 98 refracts these components by the same amount as the second birefringent wedge 100, so that they both emerge propagating in the horizontal direction, i.e. parallel to the beam 80*r*, separated only by an insignificant walk off that is exaggerated by the exploded side view. In practice the wedges and the Faraday rotation element will be closely spaced and optionally bonded with a suitable adhesive. In the context of FIG. 5, the horizontally propagating components 80*r*-1 and 80*r*-2 effectively form a single beam that can be launched into the centrally located fibre 26, which in this case would not be the input fibre. Instead, the input beam 104 could be launched from an input fibre 105 that is angled with respect to the fibres 36 in the fibre array 49.

Referring back to FIG. 4, we now describe exemplary optical systems 38 for mixing the returning probe beams with a reference beam from the reference path fibre 28 to form an interference pattern comprising a plurality of interferograms with distinct carrier frequencies, for detection with a fast linear photodiode array 42.

Figure 11:
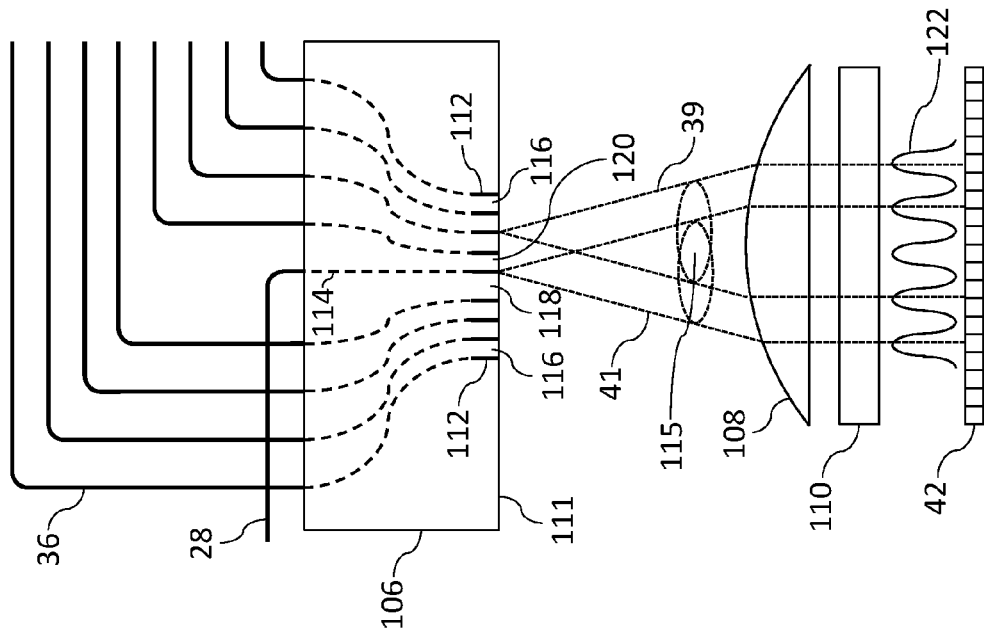
FIG. 11 shows an optical system for mixing reflected beamlets with a reference beam to form an interference pattern.

In one embodiment, shown in FIG. 11, the optical system comprises a pitch reducer in the form of an optical waveguide array such as an integrated optical waveguide device 106, and a pair of mutually orthogonal cylindrical lenses 108, 110. The integrated optical waveguide device guides back-reflected sample light, i.e. the returning probe beams, from the return optical fibres 36 and light from the reference path optical fibre 28 to a waveguide array at the output face 111 of the pitch reducer 106 comprising eight sample beamlet waveguides 112 on either side of the reference beam waveguide 114. In this particular embodiment the waveguide array is designed to provide a distinct separation between the reference beam waveguide 114 and each individual sample beamlet waveguide 112. These distinct separations ensure that each returning probe beam 39 interferes with the reference beam 41 at a different angle. Consequently the interferograms formed by the overlap 115 of the reference beam with each returning probe beam have distinct carrier frequencies. In one particular example the sample beamlet waveguides 112 on either side of the reference beam waveguide 114 are uniformly spaced on a 20 μm pitch 116, with a gap spacing 118 of 30 μm on one side of the reference beam waveguide 114 and a gap spacing 120 of 20 μm on the other side. In an alternative embodiment the pitch reduction is achieved by collimating the beams from the input array of fibres, i.e. the sample beamlet fibres 36 and the reference beam fibre 28, and using a 2F-2F lens system to demagnify them. In yet another embodiment the pitch reduction is omitted, and the return optical fibres 36 and the reference path optical fibre 28 are arranged in a V-groove array designed to provide distinct separations between the reference path optical fibre and each of the return optical fibres.

Beams 39, 41 from a selected sample beamlet waveguide 112 and the reference beam waveguide 114 are collimated by a first cylindrical lens 108 having a 30 mm focal length and placed 30 mm from the output face 111 of the pitch reducer 106, then focused onto the photodiode array 42 by a second cylindrical lens 110 having a 15 mm focal length. In an alternative embodiment the beams are collimated and focused by a combination of a spherical lens and a cylindrical lens. FIG. 11 shows a schematic interferogram 122 formed by the representative beams 39 and 41. Because the separation between the reference waveguide and the selected sample beamlet waveguide is distinct in this embodiment, there is a distinct angular difference between the respective beams. It follows that the sinusoidal intensity variations of the interferogram 122 have a distinct periodicity and can therefore be analysed individually by Fourier Transform techniques that are well known in the art. We note that interferograms from pairs of sample beamlets (returning probe beams) will also occur, but these will be much weaker in intensity and can be separated from the desired sample/reference interferograms on the basis of different carrier frequencies.

Figure 12:
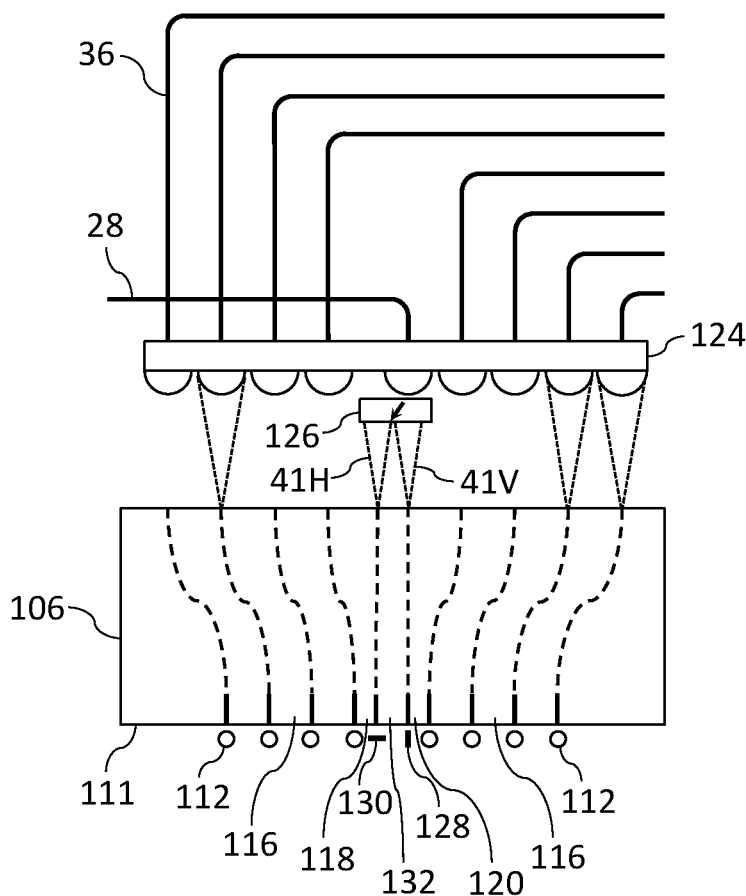
FIG. 12 shows a variation of the optical system shown in FIG. 11, modified to provide a multichannel OCT apparatus with polarisation discrimination.

In an alternative embodiment the optical system shown in FIG. 11 is modified to provide a multichannel OCT apparatus with polarisation discrimination. As shown in FIG. 12, light from the return optical fibres 36 and the reference path optical fibre 28 is focused onto the pitch reducer 106 using a micro lens array 124, with light from the reference path split according to polarisation into two separate reference beams 41V, 41H by a walk-off element 126 composed of YVO$_4$ for example. In this embodiment the pitch reducer 106 is constructed with two reference beam waveguides 128, 130 to receive the reference beams 41V, 41H corresponding to the vertical and horizontal polarisation states. In preferred embodiments the waveguide spacing at the output face 111 of the pitch reducer 106 is designed such that the separations of each of the arbitrarily polarised sample beamlet waveguides 112 to the vertical polarisation reference waveguide 128 are distinct from each of the separations to the horizontal polarisation reference waveguide 130. As explained above with reference to FIG. 11, these distinct waveguide separations provide each of the interferograms in the interference pattern with a distinct carrier frequency. Suitable waveguide positioning at the output face 111 can be easily calculated to provide an orthogonal basis set of fringe periods. In one particular embodiment the spacing 132 between the two polarisation reference waveguides 128, 130 is 30 μm, the gaps 118 and 120 to the left and right sets of sample beamlet waveguides 112 are both 20 μm, and the spacing 116 between the sample beamlet waveguides 112 is 40 μm. Compared to the polarisation insensitive optical system shown in FIG. 11, the focal lengths of the cylindrical lenses 108 and 110 (not shown in FIG. 12) need to be increased by a factor of approximately two to ensure that the fringe spacings can be resolved by the photodiode array.

In an alternative embodiment the optical system of FIG. 11 is modified to ascertain orthogonal polarisation states by means of a birefringent wedge, composed of YVO$_4$ for example, placed in the region of the lenses 108 and 110 to split each of the returning probe beams and the reference beam into a pair of cylindrical spots. Separate photodiode arrays are provided for separately detecting the interference patterns for each polarisation state. In this embodiment it is preferable for the lenses 108 and 110 to be a spherical lens and a cylindrical lens with equal focal lengths, and for the birefringent wedge to be positioned between the lenses to create the displacement at the cylindrical lens focal plane.

In each of these polarisation sensitive configurations care must be taken to control the polarisation of the swept optical source over its entire tuning range to provide a relatively constant split ratio. Furthermore the polarisation states of the returning probe beams need to be maintained over operating conditions, e.g. by keeping the return optical fibres 36 short.

In the multichannel OCT apparatus shown in FIG. 4 a plurality of probe beams 32 are generated to illuminate and interact with a plurality of regions 33 on a sample 12, and the back-reflected beams carrying information on the interaction regions directed to an optical system 38 for interference with one or more reference beams. However there are several applications, such as endoscopy, where very compact probes are required but which would nevertheless benefit from having a multichannel OCT receiver apparatus. For such applications the probe light can be delivered to an extended interaction region of a sample by means of a single optical waveguide and an imaging system that may for example include a mechanism such as a MEMS mirror for scanning the projected beam across the sample. In the context of FIG. 4 the second splitter 30 is not required in this case, although a system of collection optics 34 is still required to capture a plurality of returning probe beams emanating from one or more positions within the interaction region. In one example one could collect a plurality of returning probe beams emanating from a plurality of positions within the interaction region. In another example one could collect a plurality of returning probe beams emanating at a plurality of angles (numerical apertures) from a single position within the interaction region. In certain embodiments the system of collection optics comprises an array of waveguides, which may or may not include the delivery or sample path waveguide, and which may be configured at the sample end in either a linear or a two dimensional pattern. In certain embodiments the waveguides are individual optical fibres, while in other embodiments they are in the form of a multicore optical fibre. We consider first the case of a linear array of waveguides for providing enhanced spatial resolution in one dimension and enhancement of the sensitivity compared to a conventional single probe measurement, although there are many different waveguide configurations that could be employed.

Figure 13:
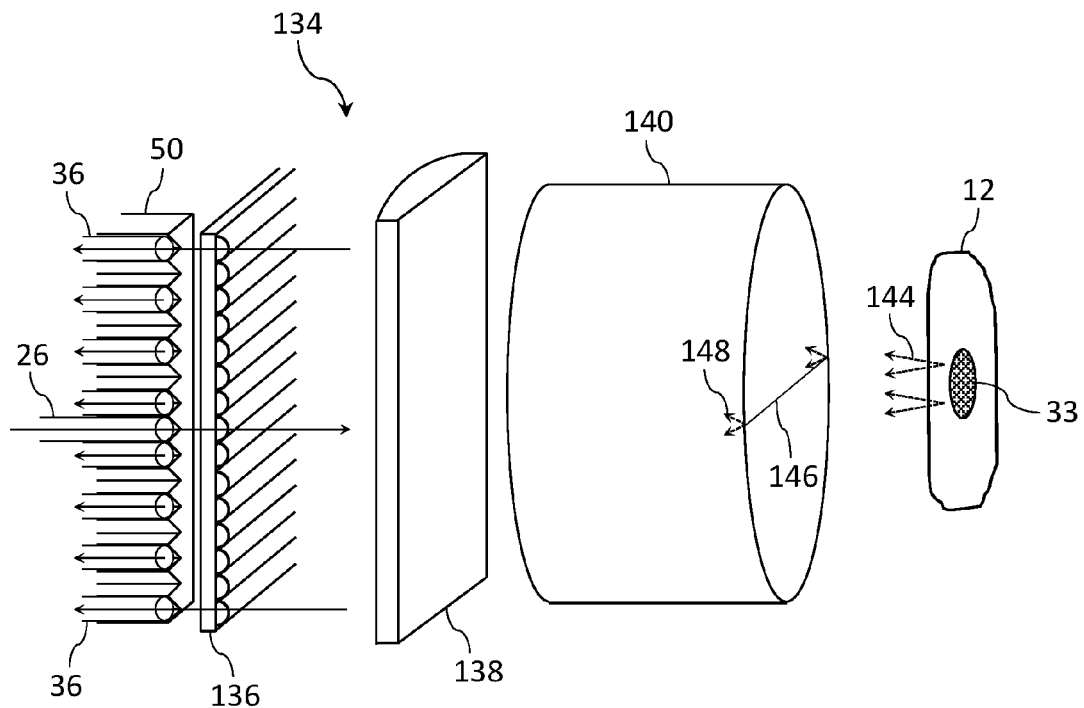
FIG. 13 shows in schematic oblique view the operation of a module for collecting a plurality of back reflected probe beams from a sample.

FIG. 13 shows in schematic oblique view an alternative probe module 134 that can be advantageously used in place of the nonreciprocal module 48 of FIG. 5. Light from a swept laser source 22 (FIG. 4) is split to a sample path fibre 26 which is positioned in a V-groove array 50 providing relative positioning with respect to the return path fibres 36. In the illustrated embodiment the return path fibres 36 are 125 μm in diameter and are positioned on a regular 250 μm centre-to-centre spacing, with the sample path fibre 26 closely spaced between the middle two return path fibres. A cylindrical micro lens array 136 is positioned adjacent to the V-groove array 50 to capture and collimate or project a beam waist in one dimension light from the sample path fibre 26, and focus the returning probe beams into the return path fibres 36. The cylindrical micro lens array 136 is designed to have a focal length of approximately 450 μm, with lenses associated with each fibre in the V-groove array 50. A cylindrical lens 138 is positioned approximately at the focal plane of the fibre/micro lens array and selected to have a focal length in the range of 0.5 to 5 mm depending on the desired numerical aperture in that dimension. This can be chosen depending on the required lateral resolution and depth of field. A GRIN lens 140 having a nominal pitch of around 0.18 and a focal length of 2.5 mm allows the focal point of the sample beam to be projected a certain distance into a sample 12. The elliptical projected beam interacts with an extended region 33 of a sample 12, and a portion of the light 144 reflected from different lateral positions or depths within the interaction region 33 re-enters the GRIN lens 140. Because the reflected light 144 can have a much larger numerical aperture than the incident probe beam, the lensing arrangement is configured to capture the higher numerical aperture components of the return light in the outside fibres of the V-groove array 50 (i.e. the return path fibres 36 further away from the sample path fibre 26). As such, from any single reflection point the signal of reflected light is not only stronger, providing enhanced sensitivity, but also the information can be used to provide enhanced lateral resolution.

The GRIN lens 140 provides the function of an optical Fourier transform, so that measuring the optical field at regular intervals in the Fourier domain using the optical system 38 of FIG. 4 permits a numerical reconstruction using a Fast Fourier Transform of higher optical resolution in the spatial domain. Because the optical fibres within the module 134 may experience mechanical and thermal variations over time, the relative phase between them may need to be regularly referenced. This can be achieved by means of an etched reflective line 146 or dot at the distal end of the GRIN lens that scatters a small amount of light 148 with high NA into each of the return fibres 36. The relative phase delay of the different return path fibres can be constantly calibrated in each scan using knowledge of this constant scattering point. Additionally, if used in a scanning application this reference line or dot can advantageously allow a relative phase reference between samples for synthetic aperture approaches such as the approach described in B. J. Davis et al 'Interferometric synthetic aperture microscopy: Physics-based image reconstruction from optical coherence tomography data', 14$^{th}$ International Conference on Image Processing, 16-19 Sep. 2007, San Antonio, Tex., pp IV-145 to IV-148. This enables enhancement of the depth of field in the direction orthogonal to the fibre array, maximising the benefit of the increased resolution in the fibre array axis.

Although it may still be difficult to achieve good phase accuracy over sweeps and particularly between sequential B-sweeps, it may be advantageous to utilise the techniques of interferometric synthetic aperture microscopy (ISAM) to reconstruct locally the higher resolution (over an extended depth of field) in the direction of the sweep, and to reconstruct the high resolution image A-scans in the dimension parallel to the array.

Additionally the methods and apparatus described above can be usefully applied to speckle reduction techniques such as those described in J. M. Schmitt 'Array detection for speckle reduction in optical coherence microscopy', *Phys. Med. Biol.* 42(7), 1427 (1997), and in U.S. Pat. No. 8,559, 012 entitled 'Speckle reduction in optical coherence tomography by path length encoded angular compounding'.

Figure 14:
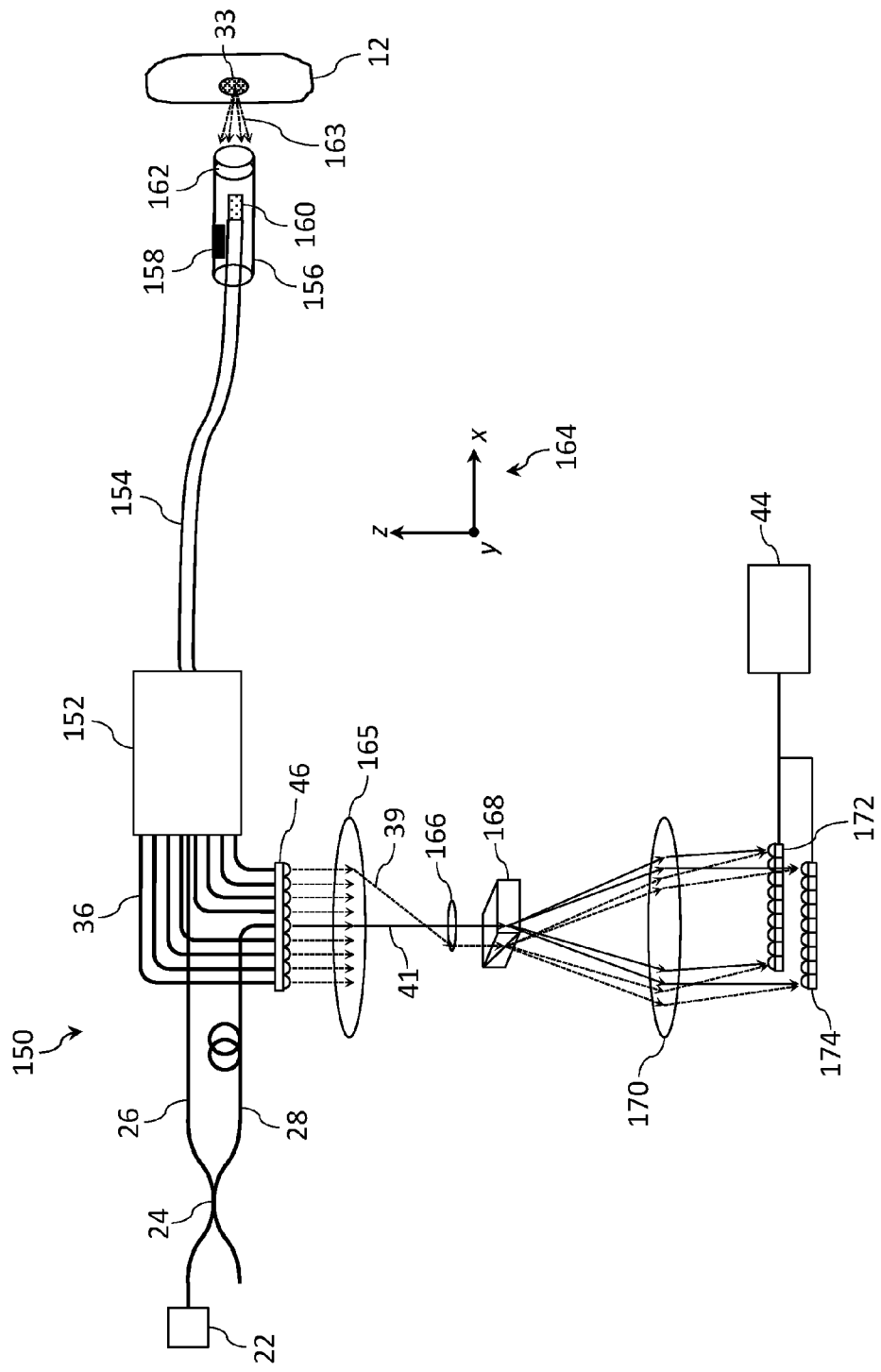
FIG. 14 shows in schematic form a multichannel OCT apparatus according to an embodiment of the present invention.

FIG. 14 shows a multichannel OCT apparatus 150 according to another embodiment of the present invention, advantageous for applications requiring a very compact delivery system, for example endoscopic OCT or needle OCT systems where high flexibility and minimal size is advantageous. Light from a swept laser 22 is split by a coupler 24 into a sample path fibre 26 and a reference path fibre 28. Sample path light is coupled via a singlemode fibre fan out unit 152, described for example in K. Watanabe et al, 'Development of fiber bundle type fan-out for 19-core multicore fiber', proceedings of 2014 OECC/ACOFT (6-10 Jul. 2014), pp 44-46, into the central core of a multicore optical fibre 154. This multicore fibre may for example be a 19 core fibre produced by Furakawa Fitel having a central core, an inner ring of 6 cores approximately 39 µm from the centre and an outer ring of 12 cores approximately 76 µm from the centre. Optionally (not shown) a matched micro lens array can be attached to the output of the multicore fibre 154 for mode size manipulation. Alternatively the multicore fibre can be heat treated to create a thermally expanded core (TEC) with adiabatic transitions to a lower numerical aperture of say NA=0.05 at 1300 nm.

The multicore fibre 154 is inserted into an endoscopic enclosure or a needle enclosure 156, where it can be scanned vibrationally by a distal scanning unit 158 such as a piezoelectric bimorph element as is well known to those skilled in the art. A micro gradient index lens assembly 160, preferably attached to the fibre end, is provided to project the microbeam from the central core through a thin window 162, which may include a reference reflection dot, into a sample 12 within which light is scattered elastically. In one example a GRIN lens 160 of 250 µm diameter and with a focal length of 220 µm is employed to illuminate an interaction region 33 in the far field with a waist of approximately 20 µm to ensure a sufficient imaging depth, typically of the order of 500 µm to several mm. Light 163 scattered from the interaction region in multiple directions is captured by the various cores of the multicore fibre 154 and directed through the fan out unit 152 into an array of singlemode fibres 36 which, along with the reference path fibre 28, are coupled to an array 46 of spherical micro lenses with a pitch of 127 µm.

A lensing relay comprising a spherical lens 165 having a 15 mm focal length and a cylindrical or GRIN lens 166 having a 1.0 mm focal length provides demagnification of the emerging reference beam 41 and the returning probe beams 39 in the axis of the fibre array (the x-axis as defined by the Cartesian coordinate system 164) and collimation of the beams in the orthogonal axis (the y-axis). A birefringent wedge pair 168 provides a polarisation-dependent angular deflection in the y direction to split the reference beam 41 equally according to polarisation, and the returning probe beams 39 according to their polarisation state which is not controlled. A spherical lens 170 then directs the two polarisation components for each beam onto separate lensed photodiode arrays 172 and 174 spaced apart in they direction by an amount equal to the product of the angular deflection of the wedge pair 168 and the focal length of the lens 170, which is in the range of 50 to 100 mm and chosen to match the x-axis spacing of the lensed photodiode arrays and for the central design wavelength. As the swept source 22 is tuned or stepped in wavelength under control of a computer 44 (communication link not shown) a temporal sequence of interference patterns for each of the two orthogonal polarisation states is detected and read out for analysis using suitable non-transitory machine readable program code. For each polarisation state the return path fibres 36 can then be referenced to provide an accurate phase versus wavelength calibration for all wavelengths. Again, synthetic aperture techniques can be used to acquire a high resolution A scan or a series of A scans.

As an alternative to the module 134 comprising the cylindrical lens 138 and GRIN lens 140 shown in FIG. 13, return light of high numerical aperture from an interaction region 33 can be captured with a multimode fibre and subsequently directed to an array of return path fibres 36 using mode conversion techniques that have been applied to high capacity coherent multimode transmission in telecommunications systems. For example the probe light from the sample path fibre 26 could be launched into the low NA fundamental mode of a multimode fibre and the reflected light captured in several or all of the higher order modes could be analysed individually. The analysis here needs to consider whether the mode conversion provides a one-to-one mapping between higher order modes and the return path fibres, or if there is a coupling between the modes. However in either case it will be possible to reconstruct the light beam(s) 144 emitted from the interaction region 33 if there is a suitable reference 146 such as a reflective dot placed in the system.

Figure 15:
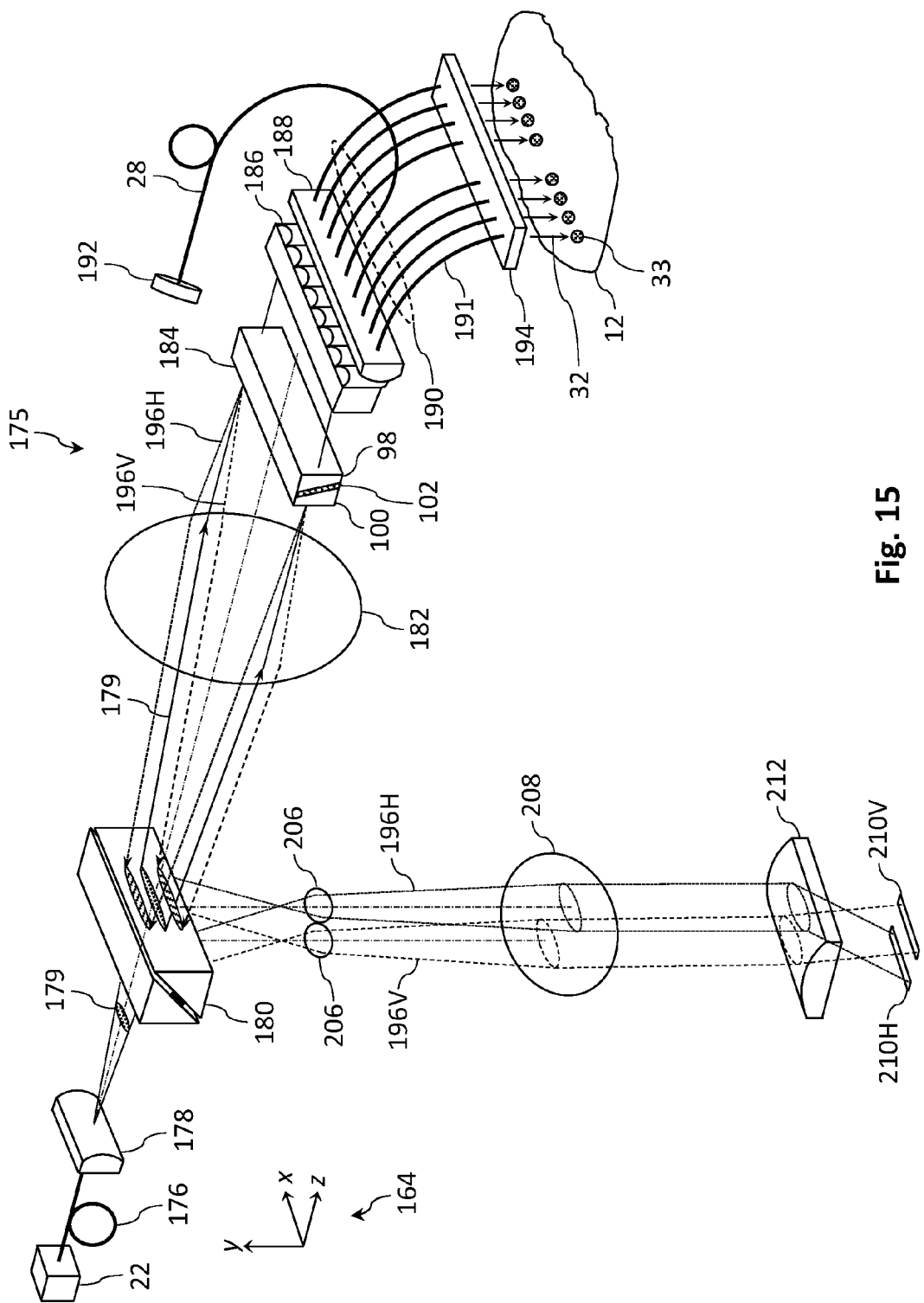
FIG. 15 shows in schematic oblique view a multichannel OCT apparatus according to another embodiment of the present invention.

FIG. 15 shows in schematic oblique view a multichannel OCT apparatus 175 according to another embodiment of the present invention which, unlike the apparatus shown in FIG. 5, does not rely on angular separation to generate multiple probe beams 32. The apparatus 175 includes an optical waveguide array in the form of an optical fibre ribbon 190 that allows the reference beam to be co-propagated in at least a portion of the its length to reduce thermal sensitivity. In a preferred embodiment the reference beam is provided by splitting off an optical fibre 28 from the fibre ribbon 190 and coupling it to a mirror 192. The relative length of the free portion of the reference fibre 28 compared to the fibre ribbon has been exaggerated in FIG. 15 for clarity, and in the interests of reduced thermal sensitivity the reference fibre should be split off as close to the sensor head 194 as practicable. Preferably, the mirror 192 is a Faraday rotator mirror, described in published US patent application No US 2002/0071624 A1, that provides a wavelength-independent rotation of the light reflected back into the reference fibre 28. This allows the polarisation state of the reference to be well defined with respect to the outgoing polarisation state from the swept wavelength source 22 for polarisation-sensitive OCT applications (PSOCT). This apparatus 175 also avoids intrinsic splitter losses and can measure both polarisation states. Furthermore it is insensitive to the fading that could occur in a polarisation-dependent OCT apparatus with a conventional fibre-coupled delivery system, as discussed in M. Tur et al 'Polarization-induced fading in fiber-optic sensor arrays', *J Lightwave Technol* 13(7), 1269-1276 (1995). In an alternative embodiment the reference beam is provided, at the cost of another probe fibre, by separating and connecting two of the fibres in the fibre ribbon 190, optionally with some form of polarisation control. In this embodiment, the fibre that returns the reference beam to the system is considered to be the reference fibre in the subsequent discussion of fibre spacings and interferogram carrier frequencies.

A wavelength tuneable or steppable source 22 is coupled to a polarisation preserving fibre 176 which delivers a beam of defined polarisation propagating in the z direction, as defined by the Cartesian coordinate system 164, to a microoptic cylindrical lens 178 which acts to collimate the beam in the y-axis while allowing it to diverge in the x-axis. The focal length of the lens 178 is approximately 500 µm, providing a collimated dimension of approximately 100 µm. The beam 179 then passes through an apertured reflector 180, described below, to a spherical lens 182 with a focal length of approximately 10 mm that acts on the diverging beam x-axis to collimate the beam 179 to a width of approximately 2 mm. At the focal plane of the lens 182 the beam 179 will be highly elongated with an aspect ratio of about 10:1 as the y-axis component will be Fourier transformed by the lens to a waist of approximately 200 µm. The beam then encounters a nonreciprocal polarisation splitter 184 configured to pass forwards propagating beams (positive z direction) without deflection, and split arbitrarily polarised backwards propagating beams into orthogonally polarised components 196-H and 196-V that propagate at angles above and below the forwards propagating beam 179. In a preferred embodiment the nonreciprocal polarisation splitter 184 comprises two birefringent wedges 98 and 100 of $YVO_4$ with optic axes oriented at 45 degrees relative to each other, separated by a Faraday rotation element 102 providing 45 degrees of nonreciprocal rotation. This nonreciprocal polarisation splitter 184 is essentially identical to the 'nonreciprocal angle unit' 96 described above with reference to FIG. 10, but operated in reverse, and serves to change the propagation angle of the returning probe beams relative to the beam 179 from the optical source 22.

After traversing the nonreciprocal polarisation splitter 184, the beam 179 then passes through a cylindrical micro lens array 186 with a pitch of 250 µm in the x-axis and a focal length of approximately 1.2 mm, followed by a cylindrical micro lens 188 having a focal length of approximately 1.1 mm. The cylindrical micro lens array 186 and cylindrical micro lens 188 are configured to convert the beam 179 into an array of beamlets and couple each of the beamlets into the fibre ribbon 190 that may be positioned in a V-groove array (not shown).

After separation of the reference fibre 28, the remaining fibres 191 in the ribbon 190 transfer the beamlets to a portable imaging or sensor head 194 which may include a micro lens array for creating and projecting an array of probe beamlets 32 onto a sample 12 to form a plurality of interaction regions 33 within which the beamlets interact with the sample. Optionally the sensor head 194 can include a MEMs-based scanning system for projecting the probe beamlets 32 onto additional regions of the sample 12. At least some of the light reflected back or otherwise emanating from each interaction region 33 is collected by the sensor head 194 and guided back to the detection portion of the apparatus as described further below.

In this embodiment the nonreciprocal polarisation splitter 184, cylindrical micro lens array 186, cylindrical micro lens 188, optical fibre ribbon 190 and sensor head 194 form an optical system that acts to separate the light from the swept source 22 into a plurality of sample beams and a reference beam, direct the sample beams onto the sample 12 to form a plurality of interaction regions 33, and collect a plurality of returning probe beams from the interaction regions.

The returning probe beams collected by the sensor head 194 and the reflected reference beam are collimated by the cylindrical micro lens 188 and the cylindrical micro lens array 186, split into orthogonally polarised components 196H and 196V by the nonreciprocal polarisation splitter 184, and directed by via the spherical lens 182 onto the apertured reflector 180 as a pair of elongated light fields above and below the outgoing beam 179. The beams in these orthogonally polarised components 196H and 196V are redirected through approximately 90 degrees by the apertured reflector 180 into the detector arm of the apparatus 175 where they are processed interferometrically.

Figure 16:
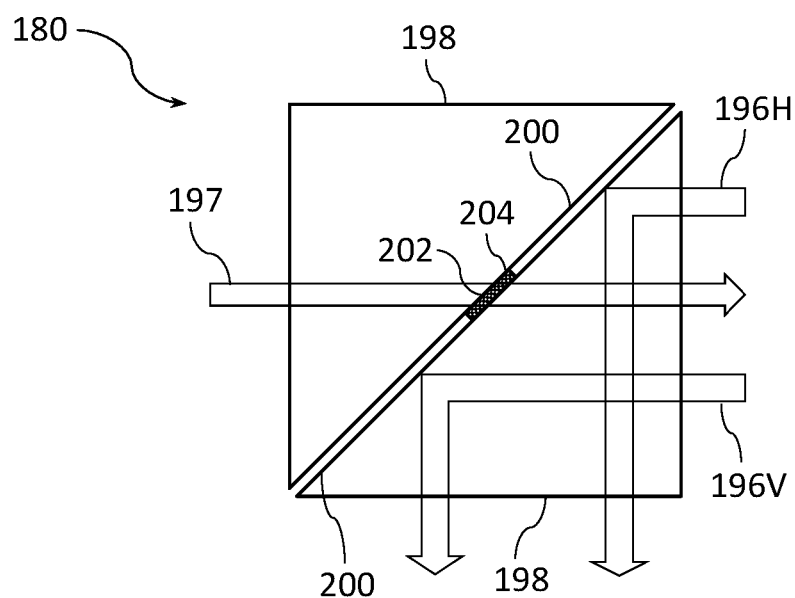
FIG. 16 shows an apertured reflector suitable for use in the apparatus of FIG. 15.

As illustrated in FIG. 16, in a preferred embodiment the apertured reflector 180 comprises a pair of right angle prisms 198 separated for example by about 10 µm, providing total internal reflection at one or other of the polished optical surfaces 200 except in the aperture 202 defined by an appropriately localised region of index matched adhesive 204 that fixedly attaches and spaces apart the reflective surfaces. The beam 197 from the swept source passes through the aperture 202 while the returning components 196H and 196V are totally internally reflected through 90 degrees. It would be straightforward to re-design the apertured reflector with two apertures to pass the returning components 196H and 196V without reflection, while reflecting the beam 197 through 90 degrees. The choice of an apertured beam splitting element 180 may be particularly advantageous over a conventional beam splitter as it enables illumination of a sample and capture of back-reflected light independent of polarisation and with low intrinsic power losses.

The returning probe beams and the reference beam in the two polarisation components 196H and 196V pass through a telescope arrangement in the form of a pair of adjacent spherical lenses 206 with focal length 2 mm followed by a spherical lens 208 with focal length 100 mm, then focused onto separate photodetector arrays 210H and 210V by a cylindrical lens 212 with focal length of approximately 10 mm. Within each polarisation component the plurality of returning probe beams mix with the reference beam to form an interference pattern which is detected and processed. In preferred embodiments the photodetector arrays 210H and 210V comprise individually wire bonded arrays of photodiodes that can be read out in parallel at speeds of up to 1 GHz or more, allowing very high speed read out capability. The photodetector arrays are preferably linear, although the same principles apply to two dimensional photodetector arrays that can be read out in parallel.

It will be appreciated that the multichannel OCT apparatus of the present invention, as described in various embodiments, provides a significant improvement in acquisition speed compared to camera-based full field parallel OCT systems. In one particular example, with 200 MHz read out speed of the photodiode array(s) an A scan with around 2000 wavelength points can be captured in around 10 µs, which is orders of magnitude faster than the 10 ms acquisition time achievable with a camera operating at a frame rate of 100s of kHz.

As in the previously described embodiments, each interference pattern comprises a plurality of interferograms corresponding to the plurality of returning sample beams. In the particular embodiment shown in FIG. 15 with eight probe fibres 191 and a reference fibre 28 in the fibre ribbon 190, 16-element photodetector arrays 210H and 210V will provide two pixels per channel after Fourier transformation of the interference pattern. The reference fibre 28 is preferably selected from a central position in the fibre ribbon 190 as shown, to improve the positioning of the channels. The fibre ribbon then is preferably selected or designed to provide distinct spacings between each of the probe fibres 191 and the reference fibre 28 at the end proximate to the cylindrical micro lens 188, to ensure that each interferogram has a distinct carrier frequency. For example the m probe fibres on one side of the reference fibre could be spaced from the reference fibre by m·250 µm, and the n fibres on the other side by (2n−1)·125 µm. While the fibre ribbon 190 shown in FIG. 15 has eight probe fibres 191, the number of probe fibres could be varied over a wide range, for example from two to forty, each with a distinct separation from the reference fibre to provide the associated interferograms with distinct carrier frequencies.

Figure 17:
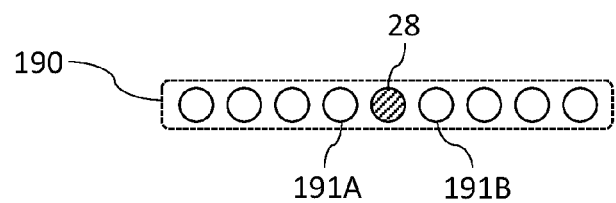
FIG. 17 shows an end-on view of an example optical fibre ribbon that could be used in the FIG. 15 apparatus.

If all of the fibres in the fibre ribbon 190 are equally spaced, the plurality of inteferograms may have some common carrier frequencies corresponding to equal but opposite angles relative to the reference beam, unless the reference fibre 28 is selected from either edge of the fibre ribbon. In one particular example shown in FIG. 17, the probe fibres 191A and 191B in the fibre ribbon 190 are equally spaced from the reference fibre 28. When propagated through each polarisation path in the detector arm of the interferometer, the returning probe beams from this pair of probe fibres, and from similar pairs, will form equal but opposite angles with the reference beam. Consequently the resulting interferograms will have common carrier frequencies. Nevertheless it is still possible to distinguish the images associated with individual probe beamlets. For example provided the depths of the interaction regions 33 within the sample 12 are all on the same side of the zero delay line, a first spectral FFT provides the complex phase for each depth without ambiguity, allowing separation of the carrier frequencies arising from positive and negative angles. The zero delay line can for convenience be positioned either in front of or behind the range of sample depths of interest. In another example, images associated with individual probe beamlets can be distinguished through the use of polarisation to create an in-phase interferogram in one polarisation state and a quadrature interferogram in the orthogonal polarisation state. This is done at the expense of being able to resolve polarisations at the sample, since the return beams must now be single polarisation. In yet another example, images associated with individual probe beamlets can be distinguished by generating and detecting two interference patterns while applying different relative phases, e.g. 0 and 90 degrees, to the reference beam.

Similar considerations on distinct and non-distinct carrier frequencies apply to the array of optical fibres 36 in FIG. 14, and to situations where there may be more than two interferograms with common carrier frequencies, for example in a two dimensional arrangement of probe fibres around a reference fibre.

The above-described embodiments of a multichannel optical coherence tomography (OCT) apparatus are all examples of swept source OCT systems as shown in general form in FIG. 3. In such systems the narrowness of the instantaneous spectral bandwidth 23 provides a relatively large in-sample depth over which coherent interference, and hence an A scan, can be obtained. However the various embodiments of multichannel receivers can also be adapted to provide extended depth A scans irrespective of the source bandwidth, by imparting different delays to the returning probe beams before they are interfered with a reference beam to create the spatial fringes. This may for example be achieved by using different lengths of optical fibre, and enables the in-sample depth over which coherent interference can be obtained to be extended well beyond the usual coherence length.

There are also applications other than OCT where the above-described multichannel optical receivers could be applied advantageously. For example in sensing applications where coupling a beam into a singlemode fibre is difficult due to atmospheric or imaging aberrations, it may be advantageous to couple the beam into an array of waveguides using micro lens technology. Light in each of the waveguides can be analysed simultaneously, and the signal summed over the different waveguides accounting for any phase variation between the waveguides. Examples of specific applications where multichannel optical receivers can be applied advantageously include the diversity-combining techniques for coherent free space communications modelled in A. Belmonte and J. M. Kahn 'Capacity of coherent free-space links using diversity-combining techniques', *Optics Express* 17(15), 12601-12611 (2009), and optical sensing applications using coherent detection of signals from multiple fibres to increase the signal to noise ratio.

In applications such as these a multichannel optical receiver can be used to analyse two or more signals by mixing the signals with a common local oscillator, such as a reference signal, to form an interference pattern comprising two or more interferograms that have distinct carrier frequencies, detecting the interference pattern with a photodetector array, and processing the interference pattern to extract phase and amplitude information from the signals. In preferred embodiments the common local oscillator comprises a laser beam. The two or more signals may have the same polarisation state or different polarisation states. In certain embodiments the signals and the common local oscillator are derived from the same source, similar to the OCT apparatus described above with reference to FIGS. 4 and 14 for example. In embodiments where the signals and the common local oscillator are derived from different sources, the respective wavelengths preferably differ by 0.1% or less.

Many of the details of the interferometer portions of the above-described multichannel OCT apparatus, such as the optical system 38 of FIG. 4, are also applicable to multichannel optical receivers used for non-OCT applications. For example the interferometer can be configured to provide each of the two or more signals with a distinct propagation angle with respect to the common local oscillator, thereby providing a distinct carrier frequency for each interferogram. As shown in FIG. 11 the interferometer can include an optical waveguide array having a waveguide for the common local oscillator and waveguides for each of the received signals, arranged such that there is a distinct separation between the common local oscillator waveguide and each of the received signal waveguides. Alternatively, as described with reference to FIGS. 12, 14 and 15 the interferometer can be configured to provide each of the signals with two or more distinct propagation angles with respect to the common local oscillator that differ according to the polarisation state of the common local oscillator or the polarisation states of the signals. The two distinct propagation angles could result from an angular splitting of orthogonal polarisation states of either the local oscillator or the signals or both.

Although the invention has been described with reference to specific examples, it will be appreciated by those skilled in the art that the invention may be embodied in many other forms.

The claims defining the invention are as follows:

1. A multichannel optical coherence tomography apparatus comprising a wavelength tuneable or steppable optical source and an interferometer, said interferometer comprising:

means for separating light from said optical source into one or more sample beams and one or more reference beams;

means for directing said one or more sample beams onto a sample to form one or more interaction regions within which said light interacts with said sample;

means for collecting a plurality of returning probe beams emanating from said one or more interaction regions; and means for mixing said plurality of returning probe beams with said one or more reference beams to form an interference pattern comprising a plurality of interferograms having a set of spatial fringe periods, said spatial fringe periods being determined by respective angles between said returning probe beams and said one or more reference beams, wherein said set of spatial fringe periods comprises at least two distinct spatial fringe periods; and wherein said apparatus further comprises a photodetector array for detecting said interference pattern, such that a temporal sequence of interference patterns can be detected with said photodetector array as said optical source is stepped or tuned in wavelength.

2. An apparatus according to claim 1, wherein said interferometer is configured to collect a plurality of returning probe beams emanating at different angles from an interaction region, or emanating from a plurality of positions within an interaction region.

3. An apparatus according to claim 1, wherein said interferometer is configured to split a sample beam into a plurality of beamlets that interact with said sample in a plurality of interaction regions, and to collect light emanating from each of said plurality of interaction regions, to form a like plurality of returning probe beams.

4. An apparatus according to claim 3, wherein said interferometer comprises a nonreciprocal optical splitter comprising means for splitting said sample beam such that said plurality of beamlets propagate in different directions, and for transmitting said plurality of returning probe beams without directional splitting.

5. An apparatus according to claim 4, wherein said interferometer comprises a nonreciprocal optical element positioned between said optical source and said nonreciprocal optical splitter, the nonreciprocal optical element comprising means for altering the propagation direction of either said sample beam or said returning probe beams, but not both.

6. An apparatus according to claim 1, wherein said interferometer comprises an optical system having an optical waveguide array, for separating said light from said optical source into a plurality of sample beams and one or more reference beams, directing said sample beams onto said sample, and collecting said plurality of returning probe beams.

7. An apparatus according to claim 6, wherein said apparatus further comprises a nonreciprocal optical element comprising means for changing the propagation angle of said returning probe beams relative to said light from said optical source.

8. An apparatus according to claim 7, wherein said apparatus further comprises an apertured reflector for reflecting either said returning probe beams or said light from said optical source.

9. An apparatus according to claim 8, wherein said apertured reflector comprises two prisms with polished optical surfaces for total internal reflection, fixedly attached and spaced apart from each other with one or more localised regions of an index matched adhesive.

10. An apparatus according to claim 1, wherein said set of spatial fringe periods comprises between two and forty distinct spatial fringe periods.

11. An apparatus according to claim 1, wherein said set of spatial fringe periods comprises a distinct spatial fringe period for each of said plurality of interferograms.

12. An apparatus according to claim 11, wherein said interferometer is configured to provide each of said returning probe beams with a distinct propagation angle with respect to a reference beam, thereby providing said distinct spatial fringe period for each of said plurality of interferograms.

13. An apparatus according to claim 12, wherein said interferometer comprises an optical waveguide array comprising a reference beam waveguide and a plurality of probe beam waveguides arranged such that there is a distinct separation between said reference waveguide and each of said probe beam waveguides, thereby providing the distinct propagation angles.

14. An apparatus according to claim 12, wherein said interferometer is configured to provide each of said returning probe beams with two or more distinct propagation angles with respect to a reference beam.

15. An apparatus according to claim 14, wherein said interferometer is configured to provide each of said returning probe beams with distinct propagation angles with respect to two reference beams having different polarisation states.

16. An apparatus according to claim 15, wherein said interferometer comprises a polarisation splitter for forming two reference beams having different polarisation states.

17. An apparatus according to claim 16, wherein said interferometer comprises an optical waveguide array comprising a waveguide for each of said two reference beams and a plurality of probe beam waveguides, arranged such that there is a distinct separation between each of said reference waveguides and each of said probe beam waveguides, thereby providing said distinct propagation angles with respect to two reference beams.

18. An apparatus according to claim 14, wherein said interferometer comprises a polarisation splitter for splitting said reference beam and said returning probe beams according to their polarisation state.

19. An apparatus according to claim 1, wherein said photodetector array is configured to be read out in parallel.

20. A multichannel optical receiver for analysing two or more signals, said multichannel optical receiver comprising an interferometer and a photodetector array, said interferometer comprising:

means for receiving said two or more signals; and
means for mixing said two or more signals with a common local oscillator comprising a laser beam to form an interference pattern comprising two or more interferograms for detection with said photodetector array, wherein each interferogram has a distinct spatial fringe period;

and wherein said interferometer further comprises means for providing each of said two or more signals with a distinct propagation angle with respect to said common local oscillator, thereby providing said distinct spatial fringe period for each interferogram.

21. A multichannel optical receiver according to claim 20, wherein said two or more signals have the same polarisation state, and wherein said multichannel optical receiver further comprises a processor for analysing the phase and amplitude of said two or more signals.

22. A multichannel optical receiver according to claim 20, wherein said two or more signals are derived from the same source as said common local oscillator.

23. A multichannel optical receiver according to claim 20, wherein the wavelength of said common local oscillator differs from the wavelength of each of said two or more signals by 0.1% or less.

24. A multichannel optical receiver according to claim 20, wherein said interferometer comprises an optical waveguide array comprising a waveguide for said common local oscillator and a waveguide for each received signal, wherein said waveguides are arranged such that there is a distinct separation between the common local oscillator waveguide and each of the received signal waveguides, thereby providing the distinct propagation angles.

25. A multichannel optical receiver according to claim 20, wherein said interferometer is configured to provide each of said two or more signals with two or more distinct propagation angles with respect to said common local oscillator, wherein said two or more distinct propagation angles differ according to the polarisation state of said common local oscillator or the polarisation states of said signals.

26. A method for analysing a sample, said method comprising the steps of:
   separating light from a wavelength tuneable or steppable optical source into one or more sample beams and one or more reference beams;
   directing said one or more sample beams onto said sample to form one or more interaction regions within which said light interacts with said sample;
   collecting a plurality of returning probe beams emanating from said one or more interaction regions;
   mixing said plurality of returning probe beams with said one or more reference beams to form an interference pattern comprising a plurality of interferograms having a set of spatial fringe periods, said spatial fringe periods being determined by respective angles between said returning probe beams and said one or more reference beams, wherein said set of spatial fringe periods comprises at least two distinct spatial fringe periods; and
   detecting said interference pattern with a photodetector array, such that a temporal sequence of interference patterns can be detected with said photodetector array as said optical source is stepped or tuned in wavelength.

27. A method for analysing two or more signals, said method comprising the steps of:
   receiving said two or more signals;
   mixing said two or more signals with a common local oscillator comprising a laser beam to form an interference pattern comprising two or more interferograms, wherein each interferogram has a distinct spatial fringe period;
   detecting said interference pattern with a photodetector array; and
   processing said interference pattern to analyse the phase and amplitude of said two or more signals,
   wherein said distinct spatial fringe periods are determined by distinct propagation angles of each of said two or more signals with respect to said common local oscillator.

* * * * *